(12) United States Patent
Wang

(10) Patent No.: US 11,159,260 B2
(45) Date of Patent: Oct. 26, 2021

(54) METHOD, DEVICE, SYSTEM, AND STORAGE MEDIUM FOR LIVE BROADCAST DETECTION AND DATA PROCESSING

(71) Applicant: ALIBABA GROUP HOLDING LIMITED, Grand Cayman (KY)

(72) Inventor: Kang Wang, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/455,302

(22) Filed: Jun. 27, 2019

(65) Prior Publication Data
US 2020/0007252 A1 Jan. 2, 2020

(30) Foreign Application Priority Data
Jul. 2, 2018 (CN) .......................... 201810708589.9

(51) Int. Cl.
*H04N 7/167* (2011.01)
*H04H 60/23* (2008.01)
*H04H 60/40* (2008.01)
*H04H 20/18* (2008.01)
*H04H 60/13* (2008.01)

(52) U.S. Cl.
CPC ............ *H04H 60/23* (2013.01); *H04H 20/18* (2013.01); *H04H 60/13* (2013.01); *H04H 60/40* (2013.01)

(58) Field of Classification Search
CPC ......... H04N 21/2187; H04N 21/21805; H04N 21/23418; H04N 21/2541
See application file for complete search history.

(56) References Cited

U.S. PATENT DOCUMENTS 8,990,951 B1 * 3/2015 Kruger .................... G06F 21/10
726/26
2004/0219184 A1 11/2004 Brown et al.
(Continued)

FOREIGN PATENT DOCUMENTS

| CN | 101340556 A | 1/2009 |
| CN | 103416079 A | 11/2013 |
| CN | 108012122 A | 5/2018 |

OTHER PUBLICATIONS

First Chinese search report Application No. 2018107085839, dated Feb. 23, 2021 (2 pages).

*Primary Examiner* — Gigi L Dubasky
(74) *Attorney, Agent, or Firm* — Finnegan, Henderson, Farabow, Garrett & Dunner, LLP

(57) ABSTRACT

The present disclosure provides methods, devices, systems, and storage mediums for live broadcast detection and data processing. In one exemplary embodiments, a user terminal device cooperates with a server and a camera device in a live broadcast system. The terminal device turns towards the camera device and outputs detection content within a detection time. It can be determined whether live broadcast content uploaded/captured by the camera device includes the detection content captured by the camera device within the detection time. If the detection content is found in the live broadcast content, it can be determined that unauthorized live broadcasting exists. Accordingly, corresponding measures can be taken to stop the unauthorized live broadcasting in a timely manner, which helps improve the security of user information.

19 Claims, 20 Drawing Sheets

(56) References Cited

U.S. PATENT DOCUMENTS

| | | | |
|---|---|---|---|
| 2005/0134696 A1* | 6/2005 | Nath | G06F 21/6209 |
| | | | 348/211.9 |
| 2010/0217976 A1* | 8/2010 | Ju | G06F 21/10 |
| | | | 713/165 |
| 2014/0218544 A1* | 8/2014 | Senot | H04N 21/2187 |
| | | | 348/207.1 |
| 2014/0325550 A1* | 10/2014 | Winograd | H04N 21/8456 |
| | | | 725/19 |
| 2015/0047024 A1* | 2/2015 | Park | H04L 63/0853 |
| | | | 726/19 |
| 2017/0279757 A1* | 9/2017 | Kereth | H04L 51/10 |
| 2017/0289807 A1* | 10/2017 | Mendonca | G06F 3/0488 |
| 2018/0159914 A1* | 6/2018 | Zamaraiev | H04N 21/2743 |

\* cited by examiner

220

```
A server receives a live broadcast detection request sent by a terminal device, and     — 221
the live broadcast detection request is used for requesting a server to perform live
            broadcast detection on a target camera device
```

```
The server searches for, according to the live broadcast detection request, detection   — 222
        content in live broadcast content uploaded by the target camera device
```

```
Generate and return a live broadcast detection result to the terminal device when       — 223
                      the detection content is found
```

FIG. 2B

METHOD, DEVICE, SYSTEM, AND STORAGE MEDIUM FOR LIVE BROADCAST DETECTION AND DATA PROCESSING

CROSS-REFERENCE TO RELATED APPLICATION

This application claims priority to and the benefits of priority to Chinese Application No. 201810708589.9, filed on Jul. 2, 2018, which is incorporated herein by reference in its entirety.

TECHNICAL FIELD

The present disclosure relates to the field of Internet technologies, and in particular, to methods, devices, systems, and storage mediums for live broadcast detection and data processing.

BACKGROUND

A camera, also referred to as a computer camera, a computer eye, an electronic eye, or the like, is a video input device widely used in contexts such as video conferencing, telemedicine, and real-time monitoring. Users can also conduct video or audio communications with each other via the network. Nowadays, cameras are involved in various aspects of daily life. The improvement of the network speed and the popularity of cameras and smart terminals have stimulated the development of the live streaming industry. Live streaming services can provide users with real-time live broadcast content. Live broadcast content can include various types of information, such as entertainment, everyday life, games, and sports.

While bringing convenience to the users, live streaming services also have some potential information security risks. For example, some live broadcast content may be broadcast without the users' knowledge. That is, unauthorized live broadcast may be involved in the existing live broadcast services. There is a need to address this problem and ensure the security of user information.

SUMMARY

The present disclosure provides methods, devices, systems, and storage mediums for live broadcast detection and data processing. One advantage of the technical solutions provided herein is to detect live broadcast content and identify unauthorized live broadcast, thereby improving the security of user information.

According to some embodiments of the present disclosure, live broadcast detection systems are provided. One exemplary system includes: a terminal device, a camera device, and a server. The terminal device can be configured to: send a live broadcast detection request to the server to request the server to perform live broadcast detection on the camera device; turn towards the camera device and output detection content; and receive a live broadcast detection result returned by the server. The camera device can be configured to: capture content within a field of view and upload the captured live broadcast content to the server. The server can be configured to: receive the live broadcast detection request sent by the terminal device; search for the detection content in the live broadcast content uploaded by the camera device; and return the live broadcast detection result to the terminal device if the detection content is found.

According to some embodiments of the present disclosure, live broadcast detection methods performed by a server are further provided. One exemplary method includes: receiving a live broadcast detection request sent by a terminal device, the live broadcast detection request being configured to request live broadcast detection on a target camera device; searching for detection content in live broadcast content uploaded by the target camera device; and returning a live broadcast detection result to the terminal device if the detection content is found.

According to some embodiments of the present disclosure, live broadcast detection methods performed by a terminal device are further provided. One exemplary method includes: sending a live broadcast detection request to a server to request the server to perform live broadcast detection on a target camera device; turning towards the target camera device and outputting detection content; and receiving a live broadcast detection result returned by the server, the live broadcast detection result being generated when the server finds the detection content captured by the target camera device in the live broadcast content uploaded by the target camera device.

According to some embodiments of the present disclosure, servers are further provided. One exemplary server includes: a memory, a processor, and a communication component. The communication component can be configured to: receive a live broadcast detection request sent by a terminal device, the live broadcast detection request being configured to request live broadcast detection on a target camera device; and receive live broadcast content uploaded by the target camera device. The memory can be configured to store a computer program. The processor can be configured to execute the computer program to: search for detection content in the live broadcast content uploaded by the target camera device; and if the detection content is found, return a live broadcast detection result to the terminal device through the communication component.

According to some embodiments of the present disclosure, computer-readable storage mediums storing a computer program are further provided. When the computer program is executed by a processor, the processor can be caused to perform: receiving a live broadcast detection request sent by a terminal device, the live broadcast detection request being configured to request live broadcast detection on a target camera device; searching for detection content in live broadcast content uploaded by the target camera device; and returning a live broadcast detection result to the terminal device if the detection content is found.

According to some embodiments of the present disclosure, terminal devices are further provided. One exemplary terminal device includes: a memory, a processor, and a communication component. The communication component can be configured to send a live broadcast detection request to a server to request the server to perform live broadcast detection on a target camera device. The memory can be configured to store a computer program. The processor can be configured to execute the computer program to: turn towards the target camera device and output detection content; and receive a live broadcast detection result returned by the server through the communication component, the live broadcast detection result being generated when the server finds the detection content captured by the target camera device in live broadcast content uploaded by the target camera device.

According to some embodiments of the present disclosure, computer-readable storage mediums storing a computer program are further provided. When the computer program is executed by a processor, the processor is caused to perform: sending a live broadcast detection request to a server to request the server to perform live broadcast detection on a target camera device; turning towards the target camera device and outputting detection content; and receiving a live broadcast detection result returned by the server, the live broadcast detection result being generated when the server finds the detection content captured by the target camera device in live broadcast content uploaded by the target camera device.

According to some embodiments of the present disclosure, live broadcast detection systems are further provided. One exemplary live broadcast detection system includes: a terminal device, a camera device, and a server. The terminal device can be configured to: send a live broadcast detection request to the server to request the server to perform live broadcast detection on the camera device; turn to the camera device and output detection content; and receive a live broadcast detection result returned by the server. The server can be configured to: receive the live broadcast detection request sent by the terminal device; send the detection content to the camera device; and return the live broadcast detection result to the terminal device when a search result reported by the camera device is received. The camera device can be configured to: capture content within a field of view; receive the detection content sent by the server; search for the detection content in captured live broadcast content; and report the search result to the server when the detection content is found.

According to some embodiments of the present disclosure, live broadcast detection methods performed by a server are further provided. One exemplary live broadcast detection method includes: receiving a live broadcast detection request sent by a terminal device, the live broadcast detection request being configured to request live broadcast detection on a target camera device; sending detection content to the target camera device; and returning a live broadcast detection result to the terminal device when a search result is received from the target camera device indicating that the detection content is found in the captured live broadcast content.

According to some embodiments, live broadcast detection methods performed by a camera device are further provided. One exemplary live broadcast detection method includes: capturing content within a field of view of the target camera device, and uploading the captured live broadcast content to a server; receiving detection content sent by the server, and searching for the detection content in the captured live broadcast content; and reporting a search result to the server if the detection content is found.

According to some embodiments of the present disclosure, servers are further provided. One exemplary server comprises: a memory, a processor, and a communication component. The communication component can be configured to receive a live broadcast detection request sent by a terminal device, the live broadcast detection request being configured to request live broadcast detection on a target camera device. The memory can be configured to store a computer program. The processor can be configured to execute the computer program to: send detection content to the target camera device through the communication component; and return a live broadcast detection result to the terminal device when a search result is received from the target camera device indicating that the detection content is found in the captured live broadcast content.

According to some embodiments of the present disclosure, computer-readable storage mediums storing a computer program are further provided. When the computer program is executed by a processor, the processor can be caused to perform: receiving a live broadcast detection request sent by a terminal device, the live broadcast detection request being configured to request live broadcast detection on a target camera device; sending detection content to the target camera device; and returning a live broadcast detection result to the terminal device when a search result is received from the target camera device indicating that the detection content is found in the captured live broadcast content.

According to some embodiments of the present disclosure, camera devices are further provided. One exemplary camera device includes: a camera device, a memory, a processor, and a communication component. The camera device can be configured to capture content within a field of view. The communication component can be configured to upload live broadcast content captured by the camera device to a server in a live broadcast system, and receive detection content sent by the server. The memory can be configured to store a computer program. The processor can be configured to execute the computer program to: search for the detection content in the captured live broadcast content, and if the detection content is found, report a search result to the server through the communication component to allow the server to return a live broadcast detection result to a terminal device.

According to some embodiments of the present disclosure, computer-readable storage mediums storing a computer program are further provided. When the computer program is executed by a processor, the processor can be caused to perform: capturing content within a field of view of the target camera device, and uploading the captured live broadcast content to a server; receiving detection content sent by the server, and searching for the detection content in the captured live broadcast content; and reporting a search result to the server if the detection content is found.

According to some embodiments of the present disclosure, live broadcast detection systems are further provided. One exemplary live broadcast detection system include: a terminal device and a camera device. The camera device can be configured to capture content within a field of view, and upload captured live broadcast content to a server via a network where the camera device is located. The terminal device can be configured to: determine in response to a live broadcast detection trigger operation that it is necessary to perform live broadcast detection on the camera device; turn to the camera device and output detection content; monitor changes in network traffic where the target camera device is located; and output a live broadcast detection result if the changes in the network traffic match traffic features of the detection content.

According to some embodiments of the present disclosure, live broadcast detection methods performed by a terminal device are further provided. One exemplary method includes: determining in response to a live broadcast detection trigger operation that it is necessary to perform live broadcast detection on a target camera device; turning towards the target camera device and outputting detection content, thus allowing the target camera device to capture the detection content; monitoring changes in network traffic where the target camera device is located; and outputting a live broadcast detection result if the changes in the network traffic match traffic features of the detection content.

According to some embodiments of the present disclosure, terminal devices are further provided. One exemplary terminal device includes a memory and a processor. The memory can be configured to store a computer program. The processor can be configured to execute the computer program to: determine in response to a live broadcast detection trigger operation that it is necessary to perform live broadcast detection on a target camera device; turn towards the target camera device and output detection content, thus allowing the target camera device to capture the detection content; monitor changes in network traffic where the target camera device is located; and output a live broadcast detection result if the changes in the network traffic match traffic features of the detection content.

According to some embodiments of the present disclosure, computer-readable storage mediums storing a computer program are further provided. When the computer program is executed by a processor, the processor can be caused to perform: determining in response to a live broadcast detection trigger operation that it is necessary to perform live broadcast detection on a target camera device; turning towards the target camera device and outputting detection content, thus allowing the target camera device to capture the detection content; monitoring changes in network traffic where the target camera device is located; and outputting a live broadcast detection result if the changes in the network traffic match traffic features of the detection content.

According to some embodiments of the present disclosure, data processing methods are further provided. One exemplary data processing method includes: sending a detection request to a server to request the server to perform unauthorized live broadcast detection; outputting detection content to allow a camera device in a preset range to capture the detection content; and receiving an unauthorized live broadcast detection result returned when the server finds the detection content from a live broadcast content database.

According to some embodiments of the present disclosure, data processing methods are further provided. One exemplary data processing method includes: receiving a detection request sent by a terminal device; searching for detection content in a content database according to the detection request, the content database storing content uploaded by various camera devices; and returning an unauthorized live broadcast detection result to the terminal device if the detection content is found.

According to some embodiments of the present disclosure, data processing methods are further provided. One exemplary data processing method includes: acquiring one or more pieces of image data of a target camera device; calculating the similarity between the one or more pieces of image data and reference image data; and determining that the target camera device is a preset-type camera device if the similarity exceeds a preset threshold.

According to some embodiments of the present disclosure, computer devices are further provided. One exemplary computer device includes: a memory and a processor. The processor can be configured to store a computer program. The processor can be configured to execute the computer program to: acquire one or more pieces of image data of a target camera device; calculate the similarity between the one or more pieces of image data and reference image data; and determine that the target camera device is a preset-type camera device if the similarity exceeds a preset threshold.

According to some embodiments of the present disclosure, a terminal device on a user side cooperates with a server and a camera device in a live broadcast system. Detection content can be output within a detection time. It can be determined whether live broadcast content uploaded/captured by the camera device includes detection content captured within the detection time. That way, it can be identified whether there is unauthorized live broadcasting in the live broadcast system. Live broadcast detection can be therefore be implemented. When unauthorized live broadcasting is identified, corresponding measures can be taken to address the unauthorized live broadcasting in a timely manner, thus improving the security of user information.

BRIEF DESCRIPTION OF THE DRAWINGS

The accompanying drawings described herein are used to provide further understanding of the present disclosure, and constitute a part of the present disclosure. Exemplary embodiments of the present disclosure and descriptions of the exemplary embodiments are used to explain solutions provided in the present disclosure. The embodiments described herein do not constitute inappropriate limitations to the present disclosure. In the accompanying drawings:

FIG. 2B is a flowchart of an exemplary live broadcast detection method performed by a server according to some embodiments of the present disclosure.

DETAILED DESCRIPTION

In order to facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

Figure 1A:
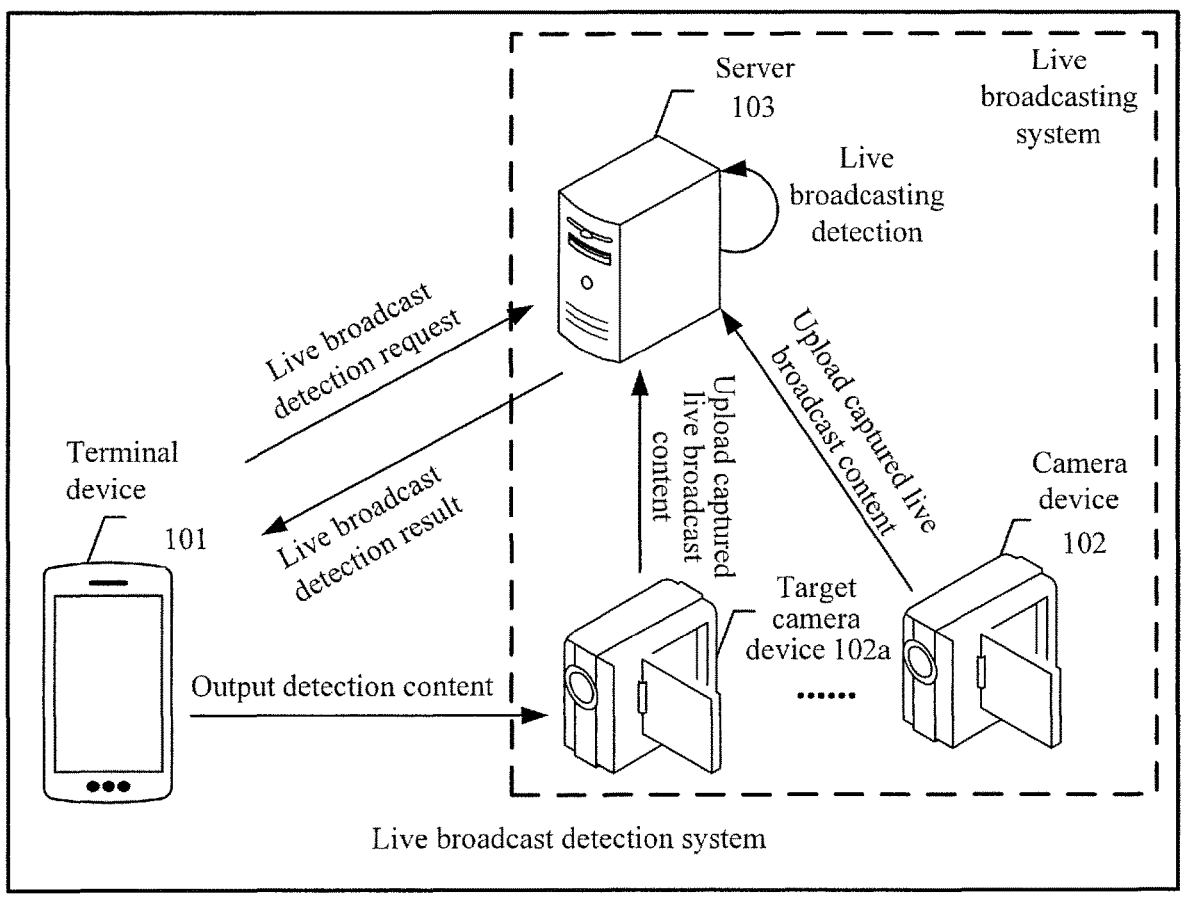
FIG. 1A is a schematic diagram of an exemplary live broadcast detection system according to some embodiments of the present disclosure.

FIG. 1A is a schematic diagram of an exemplary live broadcast detection system 100 according to some embodiments of the present disclosure. As shown in FIG. 1A, live broadcast detection system 100 includes: a terminal device 101, camera device(s) 102 (including a target camera device 102a), and a server 103.

In some embodiments, camera device 102 can include various types of smart devices with camera functions such as video capturing/transmission and static image capturing. For example, camera device 102 can include devices such as cameras, video cameras, electronic eyes, computer cameras, computer eyes, and webcams. In some embodiments, camera device 102 may be a gun-shaped camera device, a dome camera device, a half-dome camera device, a pinhole camera device, and so on. The shape or type of the camera device 102 is not limited by the embodiments described herein.

Figure 1B:
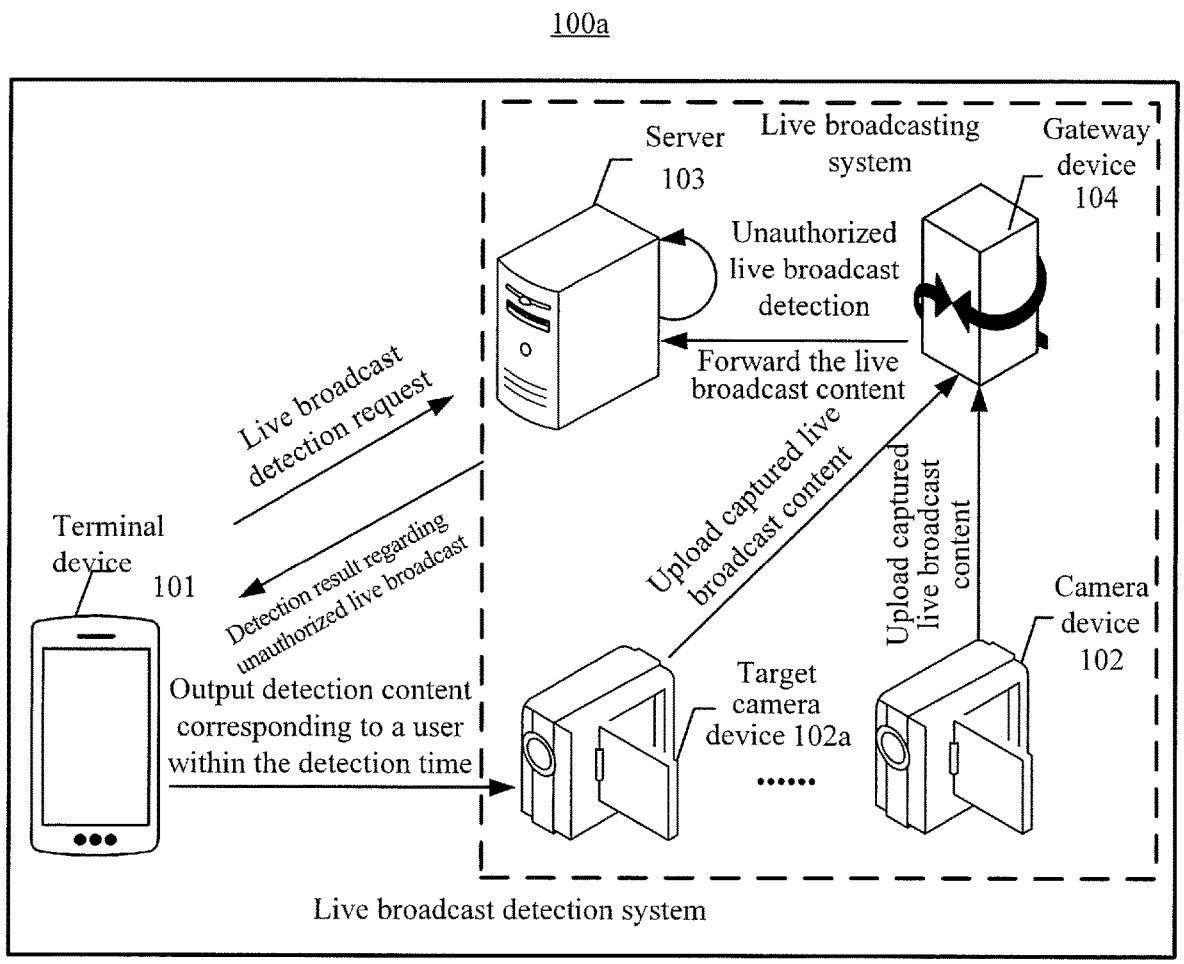
FIG. 1B is a schematic diagram of an exemplary live broadcast detection system according to some embodiments of the present disclosure.

In some embodiments, camera device 102 and server 103 can be connected in a wired or wireless manner. Camera device 102 can establish a communication connection with server 103 via WiFi, Bluetooth, infrared, and other communication modes. Alternatively, camera device 102 can also establish a communication connection with server 103 via a mobile network, as shown in FIG. 1B. FIG. 1B is a schematic diagram of an exemplary live broadcast detection system 100a according to some embodiments of the present disclosure. Similar to live broadcast detection system 100, live broadcast detection system 100a includes: a terminal device 101, camera device(s) 102 (including a target camera device 102a), and a server 103. Live broadcast detection system 100a further includes a gateway device 104. As shown in FIG. 1B, camera device 102 can establish a communication connection by a gateway device 104 in the mobile network.

When camera device 102 establishes a communication connection with server 103 via a mobile network, the mobile network can be any of 2G (GSM), 2.5G (GPRS), 3G (WCDMA, TD-SCDMA, CDMA2000, UTMS), 4G (LTE), 4G+(LTE+), WiMax, and so on. In addition, gateway device 104 may include different types of devices depending on the mobile network operators, which is not limited in the embodiments described herein.

According to some embodiments, camera device 102 and server 103, or camera device 102, server 103, and gateway device 104 may be a part of a live broadcast system. In some embodiments, the live broadcast system may include one or more servers. If the live broadcast system includes one server, the server may be used for providing live broadcasting services. For example, the server can receive live broadcast content uploaded by camera devices, store it and broadcast it over the network. If the live broadcast system includes multiple servers, some servers may be used for providing live broadcasting services. For example, the servers can store live broadcast content uploaded by camera device 102 and broadcast it over the network. Some servers can provide content storage and distribution functions. For example, the servers can store live broadcast content uploaded by camera device 102 and distribute the live broadcast content uploaded by camera device 102 to the servers providing live broadcasting services. That way, the broadcasting servers can broadcast it over the network. For the convenience of description, the servers for providing live broadcasting services in the live broadcast system can be referred to as live broadcasting servers. The servers or storing and distributing live broadcast content in the live broadcast system can be referred to as content distribution servers.

It is appreciated in the embodiments described with reference to FIG. 1A and FIG. 1B, server 103 can be a server in the live broadcast system that can access the live broadcast content uploaded by camera device 102. Server 103 can be a live broadcasting server that provides live broadcasting services, a content distribution server that stores and distributes live broadcast content, or a monitoring server that monitors and manages live broadcast content.

The implementation forms of server 103 and other servers in the live broadcast system may vary. Server 103 or other servers in the live broadcast system can be cloud servers, cloud hosts, virtual centers, and other server devices. The server device can include a processor, a hard disk, a memory, a system bus, and so on, which is similar to the architecture of a computer. In addition, if the live broadcast system includes multiple servers, the implementation forms of different servers can be the same or different.

In some embodiments, camera device 102 may use the services provided by the server(s) in the live broadcast system, such as the live broadcasting services provided by the live broadcasting server(s). Camera device 102 and the live broadcasting server can be from the same manufacturer or from different manufacturers. Camera device 102 can capture a variety of content in its field of view, such as people, scenery, objects, and screen display content. When the live broadcast function is enabled on camera device 102, all or part of the captured content can be uploaded to the live broadcasting server as live broadcast content, which enable the live broadcasting server to broadcast it over the network.

The live broadcast system can be applied in various scenarios, such as remote recruitment, online interviews, staff meetings, high-level meetings, company annual meetings, forums, summits, celebration events, online seminars, virtual activities, product promotion meetings, and various competitions. The application of the live broadcast system can facilitate user interaction, but has potential user information security risk.

As an example, referring to FIG. 1A, terminal device 101 can work with server 103 and camera device 102 in the live broadcast system, and can detect whether there is unauthorized live broadcasting. That way, the users can determine in a timely manner whether they are being broadcasted live without their authorization. The user can take corresponding measures to prevent or stop the unauthorized live broadcasting based on the determination, which can improve the degree of user information security. Unauthorized live broadcasting can refer to that the live broadcast system broadcasts user-related content without the user's knowledge, or there is unauthorized live broadcast content in the live broadcast content uploaded by the camera device.

Terminal device 101 can be a computer device used by a user and can have functions such as computing, Internet access, and communication transmission. In some embodiments, terminal device 101 can be a smart phone, a tablet computer, a wearable device, and so on. Terminal device 101 can include at least one processing unit and at least one memory. The number of the processing units and the number of the memories may vary, depending on the configuration and type of terminal device 101. The memory may include a volatile memory such as an RAM, or a non-volatile memory such as a Read-Only Memory (ROM) and a flash memory, or include both. An Operating System (OS) and one or more applications can be stored in the memory, along with program data and the like. In addition to the processing unit and the memory, terminal device 101 can also include configurations such as a network card chip, an IO bus, and an audio and video component. Further, in some embodiments, terminal device 101 can also include one or more peripherals, such as a keyboard, a mouse, a stylus, a printer, and so on.

It is appreciated that there may be one or more camera devices in the live broadcast system. For example, live broadcast detection system 100 shown in FIG. 1A can include multiple camera devices 102. Live broadcast detection system 100 can perform live broadcast detection for various camera devices in the live broadcast system. In the following, the live broadcast detection process for a target camera device 102a is described as an example. It is appreciated that target camera device 102a can be any camera device in the system.

In live broadcast detection system 100, terminal device 101 can cooperate with server 103 and target camera device 102a in the live broadcast system to perform live broadcast detection on target camera device 102a. Different processes may be performed to implement live broadcast detection according to different embodiments. In some embodiments, terminal device 101, target camera device 102a, and server 103 may cooperate with each other to implement live broadcast detection, and the detection function can be performed by server 103. In some embodiments, terminal device 101, target camera device 102a, and server 103 may cooperate with each other to implement live broadcast detection, and the detection function can be performed by camera device 102a. In some embodiments, terminal device 101 and camera device 102a may cooperate with each other to implement live broadcast detection, and the detection function can be performed through network traffic monitoring by terminal device 101. It is appreciated that in different embodiments, the functions of terminal device 101, target camera device 102a, and server 103 may vary.

Target camera device 102a can be a camera device for which a user initiates live broadcast detection. Further, target camera device 102a can be, but is not limited to, a camera device suspected of conducting unauthorized live broadcasting. For example, the user is captured by a certain camera device. If the user suspects that the camera device may upload the captured content to the live broadcast system for live streaming, live broadcast detection can be initiated, treating or identifying the camera device as the target camera device.

As an example, in some restaurants, cameras may be installed to monitor activities in the restaurants. When a user is dining in a restaurant, he/she may notice that there is a camera installed in the corner of the restaurant. In order to protect himself/herself from unauthorized live broadcasting, the user can initiate live broadcast detection by treating or identifying the camera in the restaurant as target camera device 102a.

As another example, many people have installed cameras in their homes to monitor activities in their homes. The cameras might be hacked or controlled to upload captured content to a network for live broadcasting without the users' knowledge. For privacy protection and information security, the user can initiate live broadcast detection by treating or identifying the camera in his/her home as target camera device 102a.

Similarly, in some shopping malls, cameras are generally installed out of considerations of personal and property safety. When users buy clothes in a store, they usually need to go into the fitting room to try on the clothes. In order to avoid unauthorized live broadcasting, live broadcast detection can be initiated by treating or identifying cameras in the vicinity of the fitting room as target camera device 102a.

Target camera device 102a can capture the content within its field of view. Target camera device 102a may support both a live broadcasting mode and a non-live broadcasting mode. In the live broadcasting mode, all or part of the content captured by target camera device 102a can be uploaded to the live broadcasting server in the live broadcast system for live streaming. Alternatively, if target camera device 102a may only have a default live broadcasting mode, which means that target camera device 102a can capture the content within its field of view, and upload all or part of the captured content to the live broadcasting server in the live broadcast system for live streaming.

It is appreciated that according to different service scenarios, target camera device 102a can upload all the content to the live broadcast system for live streaming, or upload part of the captured content to the live broadcast system for live streaming. Further, for the content uploaded to the live broadcast system by target camera device 102a, the live broadcast system can broadcast all the content or some of the content. The content that is uploaded by target camera device 102a to the live broadcast system which will be broadcasted live by the live broadcast system can be referred to as the live broadcast content uploaded by the target camera device.

Figure 2A:
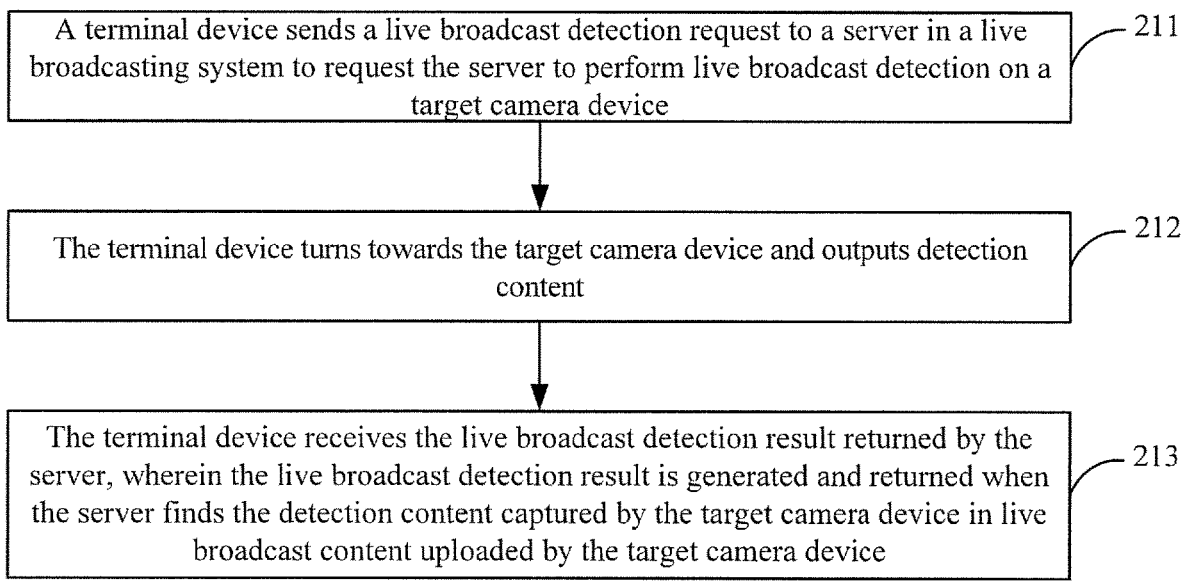
FIG. 2A is a flowchart of an exemplary live broadcast detection method performed by a terminal device according to some embodiments of the present disclosure.

FIG. 2A is a flowchart of an exemplary live broadcast detection method 210 that can be performed by a terminal device according to some embodiments of the present disclosure. As shown in FIG. 2A, live broadcast detection method 200 can include the following steps 211-213.

In step 211, the terminal device sends a live broadcast detection request to a server in a live broadcast system to request the server to perform live broadcast detection on a target camera device.

In step 212, the terminal device turns towards the target camera device and outputs detection content, thus allowing the target camera device to capture the detection content and waits for receiving a live broadcast detection result returned by the server.

In step 213, the terminal device receives the live broadcast detection result returned by the server, wherein the live broadcast detection result is generated and returned by the server when the server finds the detection content captured by the target camera device in live broadcast content uploaded by the target camera device.

FIG. 2B is a flowchart of an exemplary live broadcast detection method 220 performed by a server according to some embodiments of the present disclosure. As shown in FIG. 2B, live broadcast detection method 220 can include the following steps 221-223.

In step 221, the server receives a live broadcast detection request sent by a terminal device, and the live broadcast detection request is used for requesting the server to perform live broadcast detection on a target camera device.

In step 222, the server searches for, according to the live broadcast detection request, detection content in live broadcast content uploaded by the target camera device.

In step 223, a live broadcast detection result is generated and returned to the terminal device when the detection content is found.

In view of the above-described embodiments, live broadcast detection for the target camera device can be initiated by a user. The user can be the party who is captured by the target camera device, the owner of the target camera device, or a person who is not captured by the target camera device but suspects that the target camera device is conducting unauthorized live broadcasting. When the user initiates live broadcast detection for the target camera device, a live broadcast detection request can be sent to the server in the live broadcast system to request the server to perform live broadcast detection on the target camera device, as described in step 221. The server can be a live broadcasting server in the live broadcast system, or another server that can obtain the live broadcast content uploaded by the target camera device, such as a content distribution server.

In some embodiments, identification information of the target camera device can be carried in the live broadcast detection request. The identification information can include information associated with, for example, an IP address, the installation location, a manufacturer, a model, a production batch, production time, and the like of the target camera device. In addition, identification information of the terminal device can also be carried in the live broadcast detection request. The identification information of the terminal device can include information associated with, for example, an IP address, a MAC address, a mobile phone number registered on the server, a user account, and the like of the terminal device.

After the live broadcast detection request is sent, the terminal device can turn towards the target camera device and output detection content, thus allowing the target camera device to capture the detection content, as described in step 212. The detection content refers to the content used for the live broadcast detection. The content and the form of the detection content are not limited in the embodiments described herein. Any content of any form that can be identified by the terminal device and the server can be used as the detection content. For example, the detection content can be electronic data such as pictures, texts, videos, and animations, or non-electronic data such as a physical copy of photos.

In some embodiments, the terminal device can determine the detection time and detection content. The terminal device can turn towards the target camera device and output the detection content within the detection time, to allow the target camera device to capture the detection content within the detection time. The server can search the live broadcast content uploaded by the target camera device and determine whether it includes the detection content captured by the target camera device within the detection time. The detection time is the time when the terminal device turns towards the target camera device and outputs the detection content, which can be a time point or a time period. Using the combination of the detection content and the detection time can reduce the probability of a conflict between the detection content and normal live broadcast content, which can improve the accuracy of the live broadcast detection result.

For the target camera device, if it is in the capturing state, it can capture the detection content output by the terminal device within the detection time. For example, if the target camera device works in the live broadcasting mode and the detection content captured by it within the detection time satisfies the live broadcasting condition, the detection content captured within the detection time can be uploaded to the live broadcast system as live broadcast content.

In some embodiments, there may be no requirements or conditions for the live broadcasting, which means that all the content captured by the target camera device satisfies the live broadcasting condition by default. In some embodiments, a specific time period, specific content, and so on can be set as live broadcasting conditions. For example, the target camera device filters the captured content, and only the specific content captured within a specific time period satisfies the live broadcasting conditions. In some embodiments, a non-specific time period and non-specific content can be set as a live broadcasting conditions. That is, the target camera device filters the captured content, and only the content different from the specific content and captured outside of the specific time period can meet the live broadcasting conditions.

In some embodiments, the target camera device may work in the live broadcasting mode and upload all the captured content to the live broadcast system. The user of the target camera device may use a content filtering service, so the server in the live broadcast system filters the content uploaded by the target camera device. That way, only the content that meets the live broadcasting conditions set by the user can be used as live broadcast content. The content that does not meet the live broadcasting conditions set by the user will be filtered out and will not be broadcast. In some embodiments, the content filtered out can be stored by the user. The live broadcasting conditions set by the user are not limited by the embodiments described herein, and can be set based on the application scenario and actual application requirements.

The server can receive the live broadcast content uploaded by the target camera device, and can also receive the live broadcast detection request sent by the terminal device, as described in step 221. The server can determine according to the live broadcast detection request that it is necessary to perform live broadcast detection on the target camera device. The server can then search for the detection content in the live broadcast content uploaded by the target camera device, as described in step 222. For example, the server can determine a detection time and detection content, and search for the detection content captured within the detection time in the live broadcast content uploaded by the target camera device.

It is appreciated that the live broadcast content uploaded by the target camera device may include the detection content captured by the target camera device or the detection content captured within the detection time, or it may not include such content. If the detection content captured by the target camera device or the detection content captured within the detection time is found in the live broadcast content uploaded by the target camera device, it can indicate that the detection content captured by the target camera device or the detection content captured within the detection time will be used as the live broadcast content for live broadcasting. However, in that case, the detection content is broadcasted without the authorization of the user, so it can be determined that the target camera device is conducting unauthorized live broadcasting. A live broadcast detection result can be returned to the terminal device, as described in step 223.

On the other hand, if the detection content captured by the target camera device or the detection content captured within the detection time is not found in the live broadcast content uploaded by the target camera device, it can indicate that the detection content captured by the target camera device or the detection content captured within the detection time is not part of the live broadcast content and will not be broadcasted live. In that case, it can be determined that the target camera device is not conducting unauthorized live broadcasting.

The terminal device receives the live broadcast detection result returned by the server, as described in step 223. In some embodiments, the live broadcast detection result can be output to the user or a prompt can be sent to the user according to the live broadcast detection result, to allow the user to obtain information that is broadcasted live without his/her authorization.

In several embodiments described above, the terminal device and the server first determine the detection time and the detection content, before the detection time and the detection content are used. According to some embodiments, the detection time and the detection content can be determined in the following manners.

In some embodiments, the terminal device can generate detection content and determine the detection time. If the terminal device generates detection content and determines the detection time, the terminal device can send the detection content and information about the detection time to the server after generating the detection content and determining the detection time. For the server, determining detection content and the detection time can include: receiving the detection content and information about the detection time sent by the terminal device.

In some embodiments, the server can generate detection content and determine the detection time. If the server generates detection content and determines detection time, the server can send the detection content and information about the detection time to the terminal device after generating the detection content and determining the detection time. For the terminal device, determining detection content and the detection time can include: receiving the detection content and information about the detection time sent by the server.

The information about the detection time can be used to identify the detection time. For example, such information can include the start time of the detection time and the length of the detection time or include the start time and the end time of the detection time. It is appreciated that the detection time is later than the time when the user initiates the live broadcast detection. Further, the detection time can be a time period. If the target camera device captures the detection content, the detection content will last for a period of time in the content captured by the target camera device. The server can search for the detection content in the live broadcast content uploaded by the target camera device. With detection content that lasts for a period of time, the accuracy of the search result and the accuracy of the live broadcast detection result can be improved.

It is appreciated that the time and manner of generating the detection content by the server or the terminal device are not limited by the embodiments described herein. For example, the server or the terminal device can generate the detection content in advance. As another example, the server or the terminal device can also generate the detection content on an ad hoc basis. Similarly, the time and manner of determining the detection time by the server or the terminal device may also vary. For example, the server or the terminal device can determine the detection time with reference to the current time, and the detection time can be later than the current time. In some embodiments, if the detection time is set to sooner, the timeliness of live broadcast detection can be improved, as the user can take corresponding measures if unauthorized live broadcasting occurs.

In some embodiments, each camera device in the live broadcast detection system (such as camera device 102 shown in FIG. 1A) may have a unique key that is pre-stored at the server. For the terminal device, when the user initiates live broadcast detection for the target camera device, the key can be obtained from, for example, the user/owner of the target camera device. The server or the terminal device can determine the detection time according to the current time and generate the detection content based on the key of the target camera device and the detection time. In this manner, different detection content can be generated for different camera devices and different users, which can avoid the problem of conflicting detection content caused when multiple users initiate live broadcast detection for multiple camera devices. That way, the system can support live broadcast detection for multiple camera devices initiated by multiple users.

The form of the detection content is not limited in the embodiments described herein. Any form of the content that can be captured by the target camera device can be used. Several kinds of exemplary detection content are described in the following.

In some embodiments, the detection content can be a stroboscopic synchronous sequence. A stroboscopic synchronous sequence is a sequence of signals that flash according to a certain frequency. The stroboscopic synchronous sequence can be generated by the terminal device and provided for the server or generated by the server and provided for the terminal device. If the detection content is the stroboscopic synchronous sequence, the manner of the terminal device turning towards the target camera device and outputting the detection content within the detection time can include: outputting first prompt information to prompt a user to turn a screen or a flash light of the terminal device towards the target camera device; and adjusting, according to a stroboscopic frequency of the stroboscopic synchronous sequence, a visual attribute of the screen or the flash light of the terminal device within the detection time to output the stroboscopic synchronous sequence to the target camera device. For example, the brightness or color of the screen of the terminal device can be adjusted to form a stroboscopic synchronous sequence. Alternatively, the brightness or color of the flash light of the terminal device can be adjusted to form a stroboscopic synchronous sequence.

In some embodiments, the detection content can be electronic data that can be displayed on the screen of the terminal device. The electronic data can include, for example, an information code uniquely corresponding to the user, a photo of the user, video content including the user, or the like. The information code can be a bar code, a QR code, or the like. If the detection content is in the form of electronic data, the manner of the terminal device turning towards the target camera device and outputting the detection content within the detection time can include: displaying the detection content on a screen of the terminal device in response to a display operation of the user, and turning the screen of the terminal device towards the target camera device within the detection time, thus achieving the objective of outputting the detection content to the target camera device.

In some embodiments, the detection content can be non-electronic data carried by a physical carrier. The physical carrier can be the user himself. The user's facial expressions, body movements and so on can be used as the detection content. Alternatively, the physical carrier can be a physical photo, and the content in the photo can be used as the detection content. Further, the physical carrier can be a piece of paper, a scrap of paper, a card, and so on in a physical form. The content such as the QR code or bar code printed or displayed on the piece of paper, the scrap of paper, and the card can be used as the detection content. Furthermore, the detection content carried by the physical carrier can also be an item such as a toy or a doll. If the detection content is in the form of non-electronic detection content that can be carried by the physical carrier, the manner of the terminal device turning towards the target camera device and outputting the detection content within the detection time can include: outputting second prompt information to prompt a user to turn the physical carrier carrying the detection content towards the target camera device within the detection time to output the corresponding detection content to the target camera device within the detection time. If the target camera device is in the capturing state, it can capture video content including the detection content carried by the physical carrier. It is appreciated that if the physical carrier carrying the detection content is the user himself, the user can turn and face towards the target camera device according to the second prompt information. The user can further make a variety of body movements such as walking back and forth while turning towards the target camera device, which can increase the richness of the detection content.

Figure 2C:
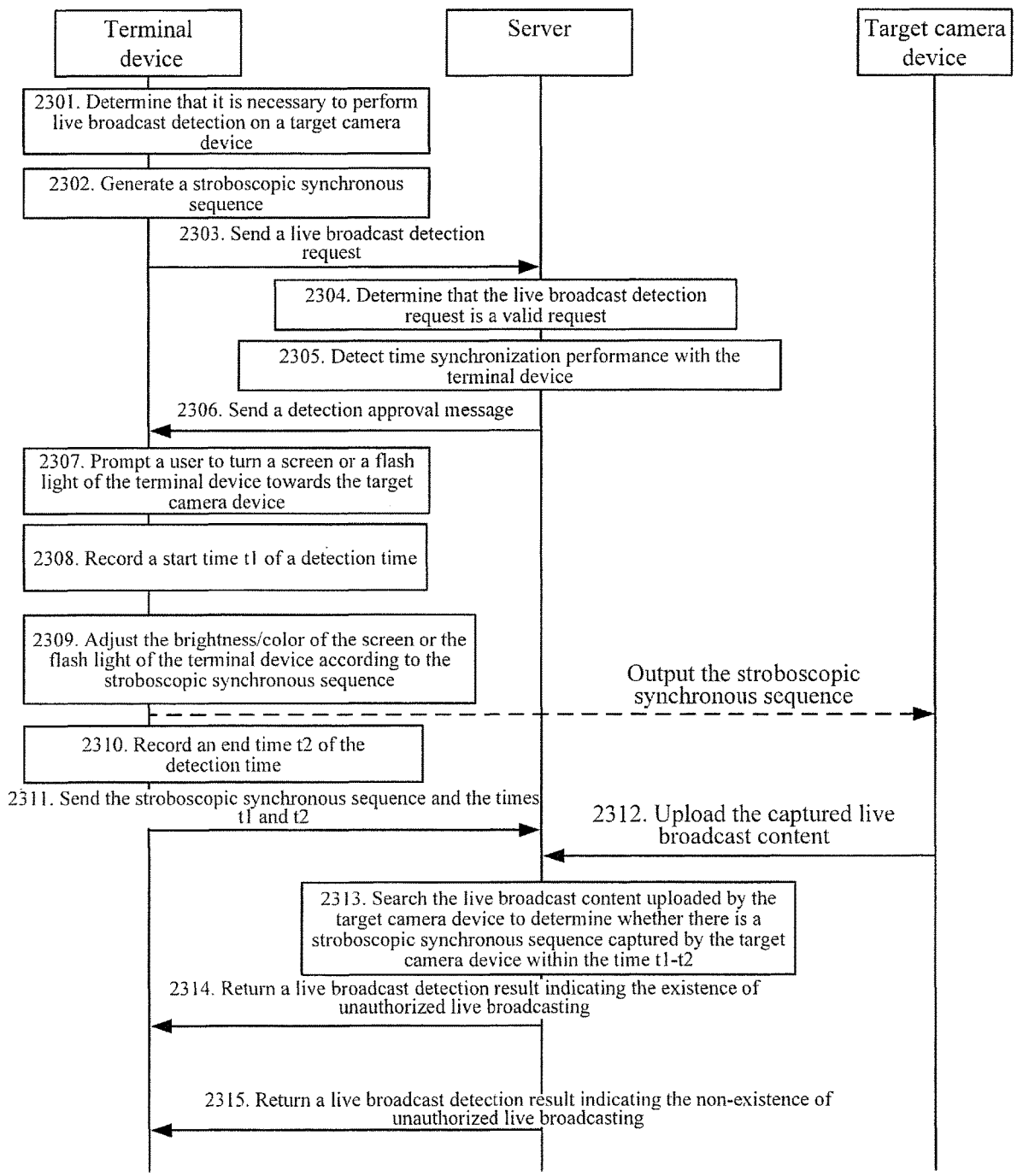
FIG. 2C is an interaction diagram illustrating an exemplary live broadcast detection method according to some embodiments of the present disclosure.

FIG. 2C is an interaction diagram illustrating an exemplary live broadcast detection method 230 according to some embodiments of the present disclosure. Live broadcast detection method 230 is described using a stroboscopic synchronous sequence as the detection content. As shown in FIG. 2C, live broadcast detection method 230 can include the following steps 2301-2313.

In step 2301, a terminal device determines in response to a live broadcast detection trigger operation initiated by a user that it is necessary to perform live broadcast detection on a target camera device.

In some embodiments, a live broadcast detection APP can be installed on the terminal device. The user can initiate a live broadcast detection trigger operation through the APP. For example, the APP can provide the user with live broadcast detection control functions on a user interface. The user can click the live broadcast detection control option to initiate the live broadcast detection trigger operation. Further, the user can also submit information related to the target camera device through the interface.

In step 2302, the terminal device generates a stroboscopic synchronous sequence.

In some embodiments, the number flashes, frequency, duration and so on of the stroboscopic synchronous sequence can be set flexibly according to actual application requirements.

In step 2303, the terminal device sends a live broadcast detection request to the server.

It is appreciated that the order of the steps 2302 and 2303 may be different from those described in FIG. 2C. In this example, step 2302 may be performed first, then step 2303 is performed. In some embodiments, step 2303 can be performed first, then step 2302 is performed. Alternatively, step 2302 and step 2303 can be performed simultaneously.

In step 2304, the server determines that the live broadcast detection request is a valid request. The determination can be made according to information about the target camera device or the terminal device.

In some embodiments, the server can determine whether the target camera device belongs to a plurality of contracted camera devices of the live broadcast system, and whether the location of the terminal device is consistent with the installation location of the target camera device. When it is determined that the target camera device belongs to the contracted camera devices and the location of the terminal device is consistent with the installation location of the target camera device, it can be determined that the live broadcast detection request is a valid request. In contrast, if the target camera device does not belong to the contracted camera devices of the live broadcast system, the live broadcast content of the target camera device may not be uploaded to the live broadcast system. In that case, the server in the live broadcast system may not be able to perform live broadcast detection on the target camera device. Thus, the live broadcast detection request initiated for that target camera device is an invalid request. Similarly, if the location of the terminal device is not consistent with the installation location of the target camera device, for example, the terminal device is located in Shanghai, while the target camera device is installed in a hotel in Beijing, the camera device in Beijing cannot broadcast the user in Shanghai. The live broadcast detection request initiated for the target camera device is therefore an invalid request.

In step 2305, the server detects time synchronization performance with the terminal device.

In some embodiments, the server can send a synchronization request message to the terminal device. The terminal device receives the synchronization request message sent by the server, and then returns a synchronization acknowledgment message to the server. The server receives the synchronization acknowledgment message returned by the terminal device. The server can determine according to the synchronization request message and the synchronization acknowledgment message whether a time delay between a local terminal and the terminal device is within a synchronization error range.

In some embodiments, the server can determine a time delay between the server and the terminal device according to the sending time of the synchronization request message and the receiving time of the synchronization acknowledgment message. The server can then compare the time delay with the synchronization error range to determine whether the time delay is within the synchronization error range.

In some embodiments, the terminal device can carry, in the synchronization acknowledgment message, the local time when the terminal device sends the synchronization acknowledgment message. Based on this, the server can acquire, from the synchronization acknowledgment message, the local time at the terminal device when the terminal device sends the synchronization acknowledgment message. The server can compare the local time of the server when the synchronization acknowledgment message is received with the local time at the terminal device when the terminal device sends the synchronization acknowledgment message, to obtain a time delay between the server and the terminal device. The server can then compare the time delay with the synchronization error range to determine whether the time delay is within the synchronization error range.

If the time delay is within the synchronization error range, it indicates that live broadcast detection can be performed in combination with the detection time, and step 236 can be performed. If the time delay is not within the synchronization error range, the live broadcast detection operation ends.

In step 2306, the server sends a detection approval message to the terminal device, to allow the terminal device to initiate a detection action.

In step 2307, the terminal device outputs prompt information after receiving the detection approval message to prompt a user to turn a screen or a flash light of the terminal device towards the target camera device.

In step 2308, the terminal device records a start time t1 of the detection time.

In step 2309, the brightness/color of the screen or flash light of the terminal device is adjusted according to the stroboscopic synchronous sequence.

In some embodiments, in step 2309, the user can manually adjust the brightness/color of the screen or flash light of the terminal device according to the stroboscopic synchronous sequence. Alternatively, the terminal device can automatically adjust the brightness/color of the screen or flash light of the terminal device according to the stroboscopic synchronous sequence.

In step 2310, the terminal device records an end time t2 of the detection time.

In step 2311, the terminal device sends the stroboscopic synchronous sequence and the start time t1 and the end time t2 of the detection time to the server.

In step 2312, the target camera device uploads captured live broadcast content to the server.

It is appreciated that step 2312 can be performed in the process of performing step 2308 to step 2310. That is, the target camera device can upload captured detection content to the server while capturing the content. In some embodiments, step 2312 can be performed after step 2310. That is, the captured content can be uploaded to the server after the detection time ends. The target camera device may or may not capture the stroboscopic synchronous sequence within the detection time.

In step 2313, the server searches the live broadcast content uploaded by the target camera device to determine whether there is a stroboscopic synchronous sequence captured by the target camera device within the time t1-t2.

If the stroboscopic synchronous sequence is found, step 2314 can be performed. In step 2314, the server returns a live broadcast detection result indicating the existence of unauthorized live broadcasting to the terminal device. The server can further stop broadcasting the live broadcast content uploaded by the target camera device.

If in step 2313, the stroboscopic synchronous sequence is not found, step 2315 can be performed. In step 2315, the server returns a live broadcast detection result indicating the non-existence of unauthorized live broadcasting to the terminal device.

Figure 2D:
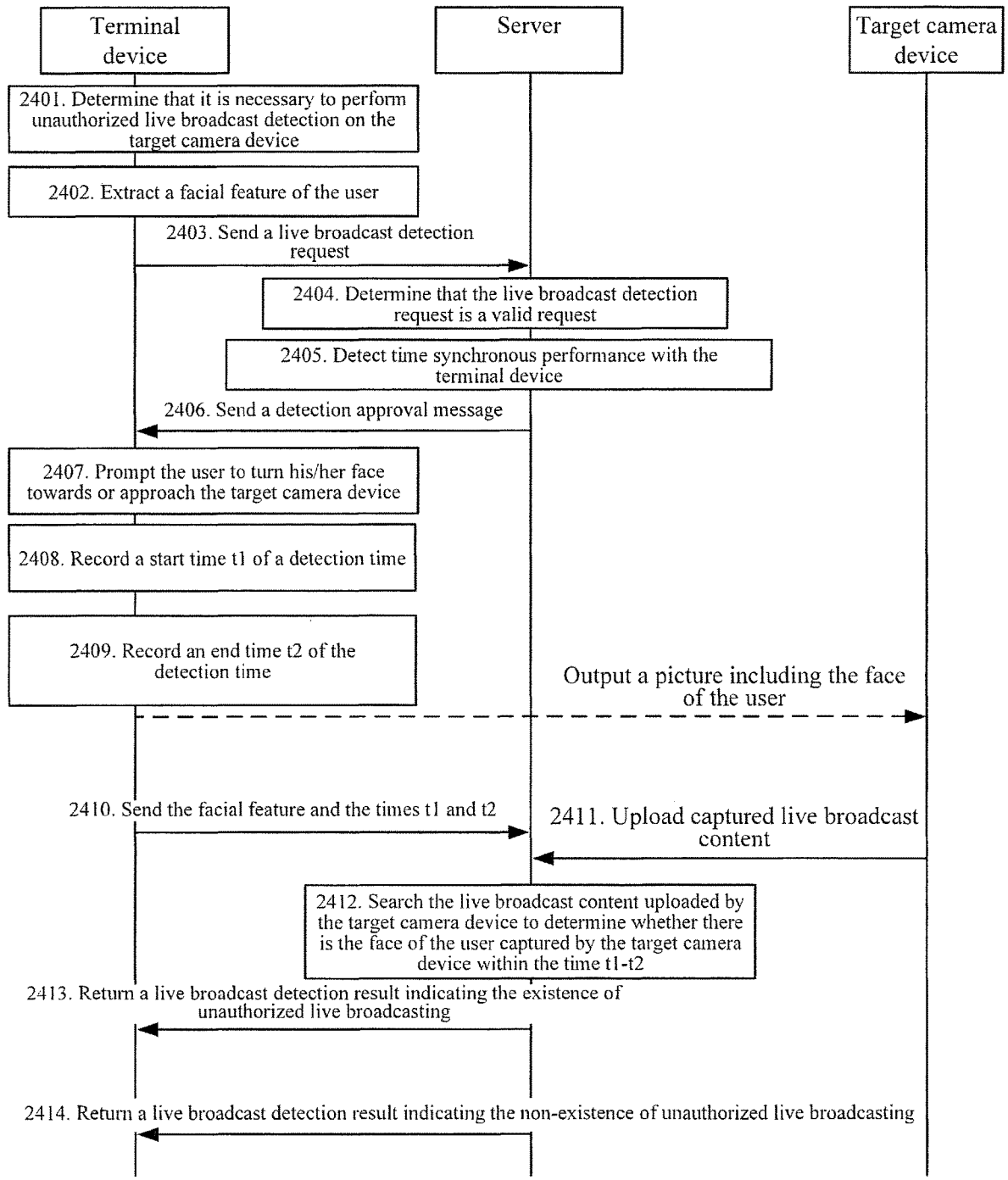
FIG. 2D is an interaction diagram illustrating an exemplary live broadcast detection method according to some embodiments of the present disclosure.

FIG. 2D is an interaction diagram illustrating an exemplary live broadcast detection method 240 according to some embodiments of the present disclosure. Live broadcast detection method 240 is described using the facial features of the user as the detection content. As shown in FIG. 2D, live broadcast detection method 240 can include the following steps 2401-2414.

In step 2401, a terminal device determines in response to a live broadcast detection trigger operation by a user that it is necessary to perform live broadcast detection on a target camera device.

In step 2402, the terminal device extracts a facial feature of the user.

In some embodiments, the terminal device can extract the facial feature of the user from a pre-stored user photo or ID card. Alternatively, the terminal device can also acquire a photo of the user in real time, and extract the facial feature of the user from the photo acquired in real time.

In step 2403, the terminal device sends a live broadcast detection request to the server. It is appreciated that the order of steps 2402 and 2403 is not limited herein. In some embodiments, these steps can be performed in a different sequence or in parallel.

In step 2404, the server determines according to information about the target camera device or the terminal device that the live broadcast detection request is a valid request.

In step 2405, the server detects time synchronization performance with the terminal device.

In step 2406, the server sends a detection approval message to the terminal device, to allow the terminal device to initiate a detection action.

In step 2407, the terminal device outputs prompt information after the detection approval message is received, for prompting the user to turn his/her face towards or approach the target camera device.

In step 2408, the terminal device records a start time t1 of a detection time.

In step 2409, the terminal device records the end time t2 of the detection time.

In step 2410, the terminal device sends the facial feature and the start time t1 and the end time t2 of the detection time to the server.

In step 2411, the target camera device uploads captured live broadcast content to the server.

In step 2412, the server searches the live broadcast content uploaded by the target camera device to determine whether there is the face of the user captured by the target camera device within the time t1-t2.

If the face of the user is found, step 2413 is performed. In step 2413, the server returns a live broadcast detection result indicating the existence of unauthorized live broadcasting to the terminal device. The server can further stop broadcasting the live broadcast content uploaded by the target camera device.

If the face of the user is not found, step 2414 is performed. In step 2414, the server returns a live broadcast detection result indicating the non-existence of unauthorized live broadcasting to the terminal device.

As described above with reference to FIG. 2C and FIG. 2D, the server can cooperate with the terminal device, to detect live broadcast content uploaded by the target camera device. The user can conveniently and timely figure out whether the target camera device is conducting unauthorized live broadcasting, and determine whether he/she is being broadcasted live without his/her authorization. Therefore, the user can take corresponding measures to prevent or stop the unauthorized live broadcasting when learning that he/she is being broadcasted. That way, the security of user information can be improved.

Figure 3A:
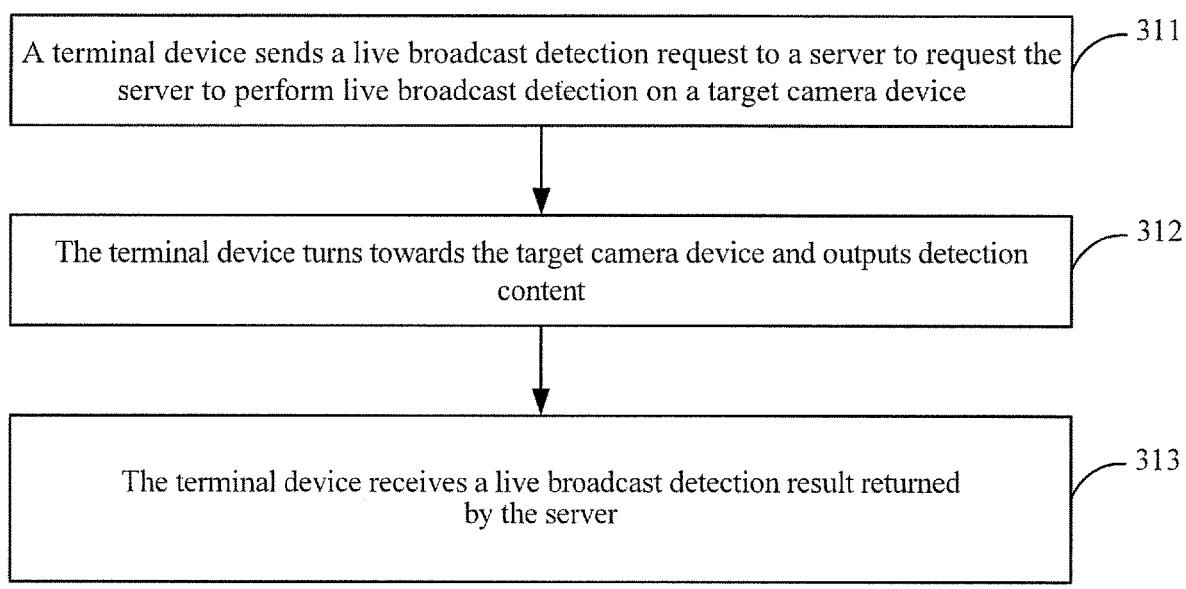
FIG. 3A is a flowchart of an exemplary live broadcast detection method performed by a terminal device according to some embodiments of the present disclosure.

FIG. 3A is a flowchart of an exemplary live broadcast detection method 310 performed by a terminal device according to some embodiments of the present disclosure. As shown in FIG. 2A, live broadcast detection method 310 can include steps 311-313.

In step 311, the terminal device sends a live broadcast detection request to a server in a live broadcast system to request the server to perform live broadcast detection on a target camera device.

In step 312, the terminal device turns towards the target camera device and outputs detection content. That way, it allows the target camera device to capture the detection content. The terminal device then waits for receiving a live broadcast detection result returned by the server.

In step 313, the terminal device receives the live broadcast detection result returned by the server. The terminal device may determine that the target camera device is conducting unauthorized live broadcasting based on the live broadcast detection result. The live broadcast detection result is generated and returned by the server when the server receives a search result reported by the target camera device indicating that detection content is found in the captured live broadcast content.

Figure 3B:
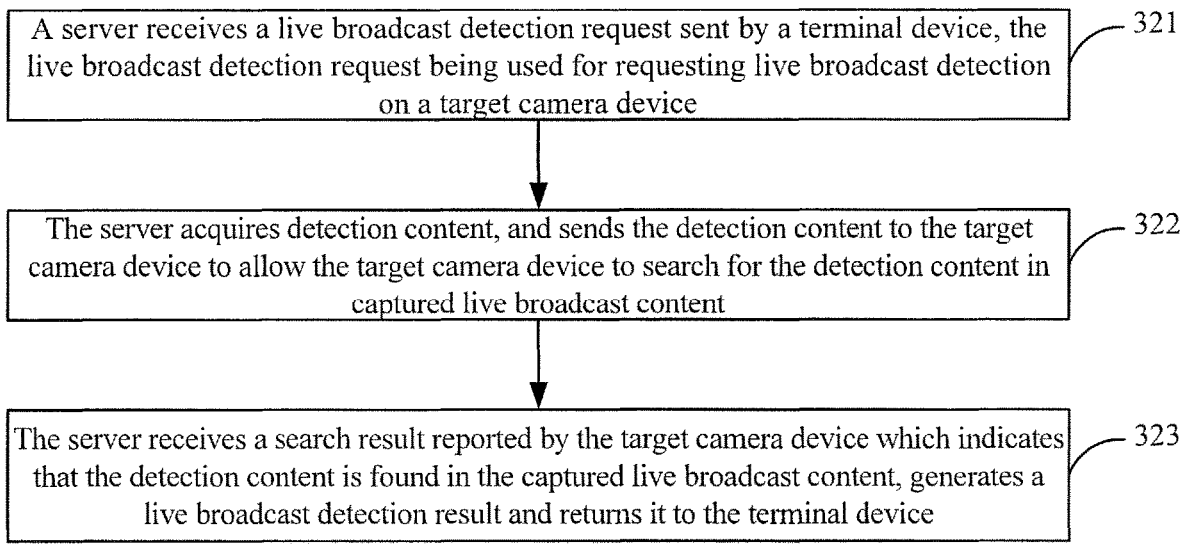
FIG. 3B is a flowchart of an exemplary live broadcast detection method performed by a server according to some embodiments of the present disclosure.

FIG. 3B is a flowchart of an exemplary live broadcast detection method 320 performed by a server according to some embodiments of the present disclosure. As shown in FIG. 3B, live broadcast detection method 320 can include the following steps 321-323.

In step 321, the server receives a live broadcast detection request sent by a terminal device, the live broadcast detection request being used for requesting live broadcast detection on a target camera device.

In step 322, the server acquires detection content, and sends the detection content to the target camera device to allow the target camera device to search for the detection content in captured live broadcast content.

In step 323, the server receives a search result reported by the target camera device which indicates that the detection content is found in the captured live broadcast content, generates a live broadcast detection result and returns it to the terminal device.

Figure 3C:
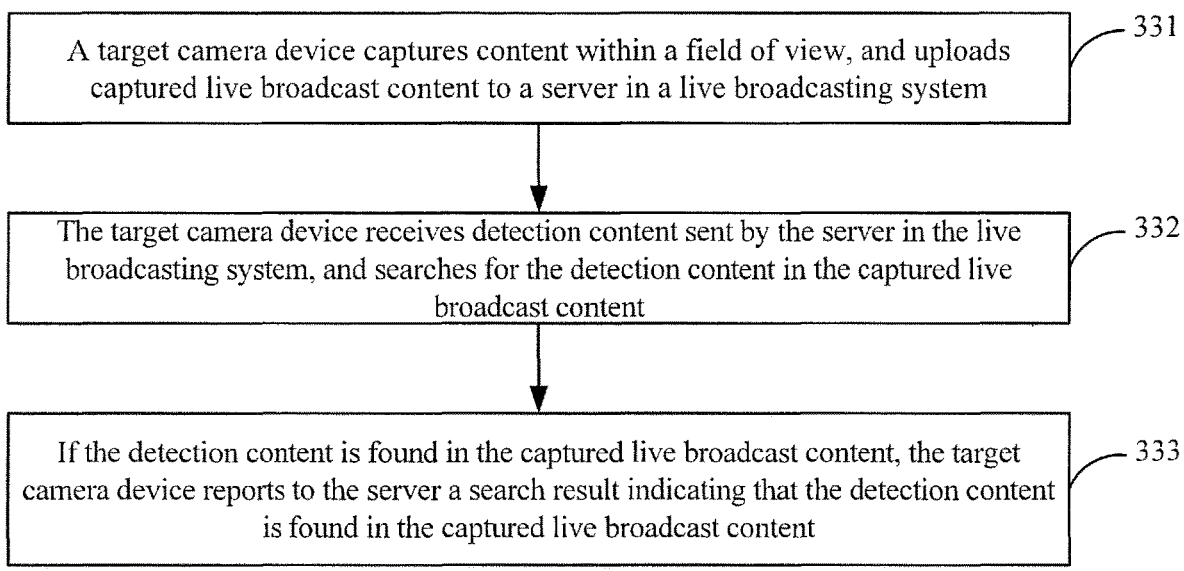
FIG. 3C is a flowchart of an exemplary live broadcast detection method performed by a camera device according to some embodiments of the present disclosure.

FIG. 3C is a flowchart of an exemplary live broadcast detection method 330 performed by a camera device according to some embodiments of the present disclosure. As shown in FIG. 3C, live broadcast detection method 330 can include the following steps 331-333.

In step 331, a target camera device captures content within a field of view, and uploads captured live broadcast content to a server in a live broadcast system.

In step 332, the target camera device receives detection content sent by the server in the live broadcast system, and searches for the detection content in the captured live broadcast content.

In step 333, if the detection content is found in the captured live broadcast content, the target camera device reports to the server a search result indicating that the detection content is found in the captured live broadcast content. The server can then return a live broadcast detection result to the terminal device.

In the above-described embodiments, the live broadcast detection for the target camera device can be initiated by a user. When the user initiates live broadcast detection for the target camera device, a live broadcast detection request can be sent to the server in the live broadcast system through the terminal device to request the server to perform live broadcast detection for the target camera device. After the live broadcast detection request is sent, the terminal device can turns towards the target camera device to output detection content, allowing the target camera device to capture the detection content.

In some embodiments, the terminal device can face the target camera device and output the detection content within the detection time, thus allowing the target camera device to capture the detection content within the detection time. The procedures for the target camera device to capture detection content and upload the living broadcast content to the live broadcast system can be similar to those described above with reference to FIGS. 2A-2D, details of which are not repeated herein.

The server, on one hand, receives the live broadcast content uploaded by the target camera device, and on the other hand, receives the live broadcast detection request sent by the terminal device. It can be determined according to the live broadcast detection request that live broadcast detection needs to be performed on the target camera device. The server can then acquire the detection content and send the detection content to the target camera device, to allow the target camera device to search in the captured live broadcast content and determine whether the detection content is included.

As described above, the target camera device can capture the content in its field of view and upload the live broadcast content captured in the live broadcasting mode to the live broadcast system. In some embodiments, the target camera device can also receive the detection content sent by the server and search in the captured live broadcast content to determine whether the detection content is included. That is, the target camera device can have the capability of identifying whether the content captured by it is included in the live broadcast content.

Further, if the terminal device turns towards the target camera device and outputs the detection content within the detection time, the server can acquire the detection content and information about the detection time. The server can send the detection content and the information about the detection time to the target camera device. The target camera device can search in the captured live broadcast content whether the detection content captured within the detection time is included.

If the detection content captured by the target camera device or the detection content captured within the detection time is found in the live broadcast content captured by the target camera device, a corresponding search result can be reported to the server. If the server receives the search result reported by the target camera device indicating that the detection content or the detection content captured within the detection time is found in the live broadcast content captured, the server can determine that the target camera device is conducting unauthorized live broadcasting. The server can then return a live broadcast detection result to the terminal device. On the contrary, if the detection content or the detection content captured within the detection time is not found, it indicates that the detection content captured by the target camera device or the detection content captured within the detection time does not belong to the live broadcast content and will not be broadcasted live. In that case, it can be determined that the target camera device is not conducting unauthorized live broadcasting.

In some embodiments, the detection time and the detection content can be acquired before the detection time and the detection content are used. For the implementation manners of acquiring the detection time and the detection content, reference can be made to the descriptions above with reference to FIGS. 2A-2D, which are not described in detail here.

Figure 3D:
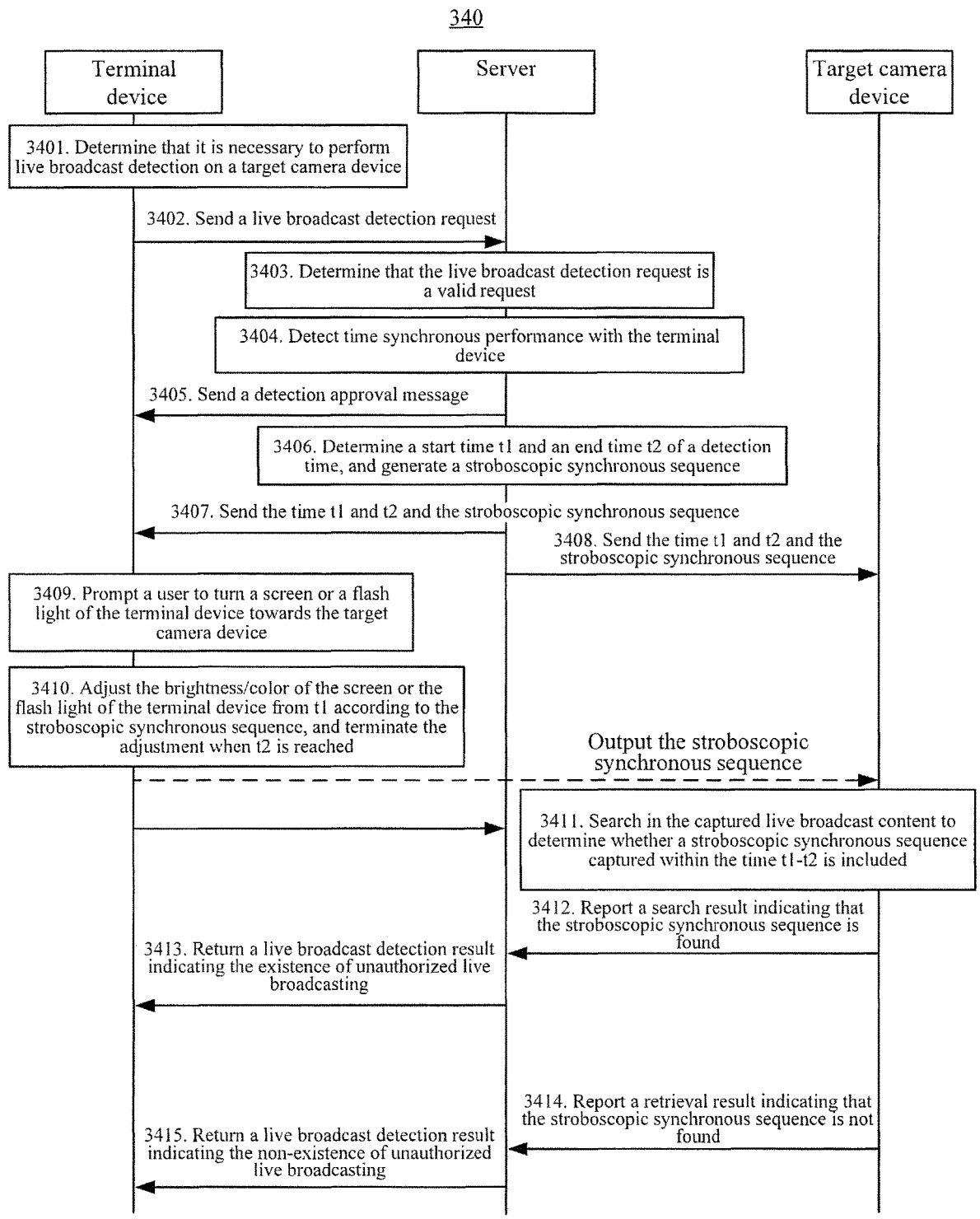
FIG. 3D is an interaction diagram illustrating an exemplary live broadcast detection method according to some embodiments of the present disclosure.

FIG. 3D is an interaction diagram illustrating an exemplary live broadcast detection method 340 according to some embodiments of the present disclosure. As shown in FIG. 3D, live broadcast detection method 340 can include the following steps.

In step 3401, a terminal device determines that it is necessary to perform live broadcast detection on a target camera device. The determination can be made in response to a live broadcast detection trigger operation of a user.

In step 3402, the terminal device sends a live broadcast detection request to the server.

In step 3403, the server determines that the live broadcast detection request is a valid request. The determination can be made according to information about the target camera device or the terminal device.

In step 3404, the server detects time synchronization performance with the terminal device.

In step 3405, the server sends a detection approval message to the terminal device, to allow the terminal device to initiate a detection action.

In step 3406, the server determines a start time t1 and an end time t2 of a detection time, and generates a stroboscopic synchronous sequence.

In step 3407, the server sends the start time t1 and the end time t2 of the detection time and the stroboscopic synchronous sequence to the terminal device.

In step 3408, the server sends the start time t1 and the end time t2 of the detection time and the stroboscopic synchronous sequence to the target camera device. The order of steps 3407 and 3408 is not limited herein, and can be performed in a different sequence or performed in parallel.

In step 3409, the terminal device outputs prompt information to prompt a user to turn a screen or a flash light of the terminal device towards the target camera device.

In step 3410, the brightness/color of the screen or flash light of the terminal device is adjusted from the start time t1 of the detection time according to the stroboscopic synchronous sequence, and the adjustment is terminated when the end time t2 of the detection time is reached.

In step 3411, the target camera device search in the captured live broadcast content and determine whether a stroboscopic synchronous sequence captured within the time t1-t2 is included.

It is appreciated that when the target camera device is on, it can capture the content within its field of view and upload the captured live broadcast content to the live broadcast system. The target camera device can also upload the non-live broadcast content captured by it to the live broadcast system for storage.

If in step 3411, the stroboscopic synchronous sequence is found in the captured live broadcast content, step 3412 can be performed. In step 3412, the target camera device reports to the server a search result indicating that the stroboscopic synchronous sequence captured within the time t1-t2 is found in the captured live broadcast content. In step 3413, the server can return a live broadcast detection result to the terminal device indicating the existence of unauthorized live broadcasting. The server can further stop broadcasting the live broadcast content uploaded by the target camera device.

If in step 3411, the stroboscopic synchronous sequence is not found in the captured live broadcast content, step 3414 can be performed. In step 3414, the target camera device reports to the server a search result indicating that the stroboscopic synchronous sequence captured within the time t1-t2 is not found in the captured live broadcast content. In step 3425, the server can return a live broadcast detection result to the terminal device indicating the non-existence of unauthorized live broadcasting.

In the embodiments described above with reference to FIG. 3D, the terminal device, the server, and the target camera device cooperate with each other in the live broadcast detection process. The target camera device detects live broadcast content captured by it according to information about the detection time and a stroboscopic synchronous sequence. The user can conveniently and timely determine whether the target camera device conducts live broadcasting, and whether he/she is being broadcasted live without authorization. Accordingly, the user can take corresponding measures to prevent or stop the unauthorized live broadcasting when learning that he/she is being broadcasted. That way, the security of user information can be improved.

It is appreciated that some procedures in the embodiments described with reference to FIG. 2D and FIG. 3D may be similar to those described with reference to FIG. 2C. For procedures not described in detail with reference to FIG. 2D and FIG. 3D, reference can be made to the corresponding description above with reference to FIG. 2C.

As described above, in some embodiments, the server can perform the following procedures. The server sends a detection approval message to the terminal device to allow the terminal device to initiate a detection action. Further, the server determines according to information about the target camera device or the terminal device that the live broadcast detection request is a valid request. The server also performs time synchronization performance and other operations with the terminal device. It is appreciated that these procedures are optional. In some embodiments, one or more of the above optional procedures may be included, and in some other embodiments, none of the above optional procedures may be included.

In some of the above described embodiments, the server provides a live broadcast detection service. In some scenarios, the server does not provide any live broadcast detection service, or the terminal device cannot be successfully connected to the server even if the server provides a live broadcast detection service. In those cases, the following technical solutions may be used to perform live broadcast detection on the target camera device.

Figure 4A:
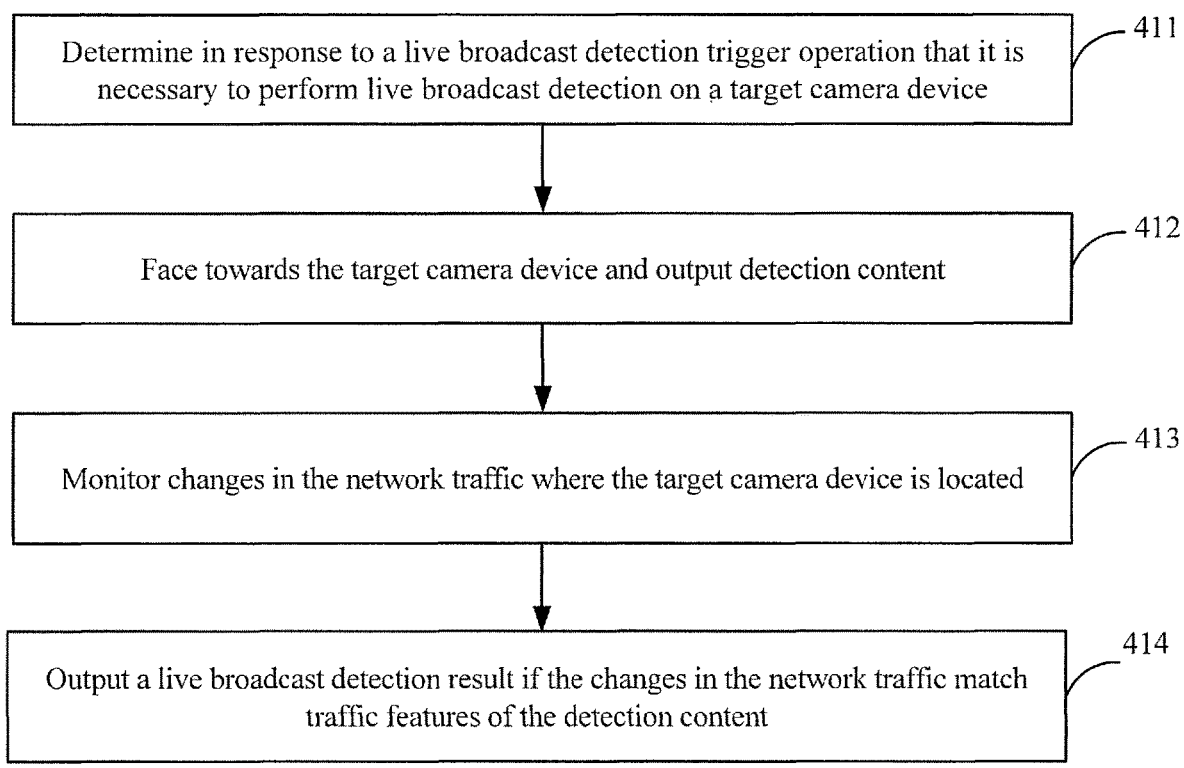
FIG. 4A is a flowchart of an exemplary live broadcast detection method performed by a terminal device according to some embodiments of the present disclosure.

FIG. 4A is a flowchart of an exemplary live broadcast detection method 410 performed by a terminal device according to some embodiments of the present disclosure. As shown in FIG. 4A, live broadcast detection method 410 can include the following steps 411-414.

In step 411, determining in response to a live broadcast detection trigger operation that it is necessary to perform live broadcast detection on a target camera device.

In step 412, facing towards the target camera device and outputting detection content, thus allowing the target camera device to capture the detection content.

In step 413, monitoring changes in network traffic where the target camera device is located.

In step 414, outputting a live broadcast detection result if the changes in the network traffic in the network where the camera device is located match traffic features of the detection content.

With live broadcast detection method 410, live broadcast detection for the target camera device can be initiated by a user. The user can initiate a live broadcast detection trigger operation. For example, a live broadcast detection APP can be installed on the terminal device. The user can initiate a live broadcast detection trigger operation through the APP. The APP can provide the user with live broadcast detection control functions on a certain interface. The user can click the live broadcast detection control option to initiate the live broadcast detection trigger operation. Further, the user can submit information related to the target camera device through the interface.

Based on the live broadcast detection trigger operation initiated by the user, the terminal device can determine that it is necessary to perform live broadcast detection on the target camera device. The terminal device can turn towards the target camera device and output detection content, allowing the target camera device to capture the detection content.

If the target camera device works in the live broadcasting mode, it can upload content captured by it to a live broadcast system if the content satisfies a live broadcasting condition. Accordingly, if the detection content captured by the target camera device satisfies the live broadcasting condition, the detection content can be uploaded to the live broadcast system as live broadcast content. This will cause changes in the network traffic in the network where the target camera device is located.

In some embodiments, the terminal device can determine a detection time and detection content, and outputs the detection content within the detection time. That way, the target camera device can capture the detection content within the detection time. If the target camera device captures the detection content within the detection time and the detection content satisfies the live broadcasting condition, the detection content can be uploaded to the live broadcast system as live broadcast content. This will cause changes in traffic in the network where the target camera device is located within the detection time. Here, in combination with the detection time, the terminal device can monitor changes in the network traffic within the detection time in the network where the target camera device is located. That way, it can help reduce the monitoring burden of the terminal device and reduce resource consumption.

In some embodiments, a traffic monitoring APP or hardware chip can be installed on the terminal device. The changes in the network traffic in the network where the target camera device is located within the detection time can be monitored through the traffic monitoring APP or hardware chip. It is appreciated that the traffic monitoring APP or hardware chip can be applicable to a variety of network types or communication protocols, or the traffic monitoring APP or hardware chip can be adapted for certain network types or communication protocols.

As described above, the terminal device can monitor the changes in the network traffic in the network where the target camera device is located within the detection time. The terminal device can then compare the monitored changes with traffic features of the detection content. If they match each other, it can indicate that the target camera device uploads the detection content captured within the detection time to the live broadcast system as live broadcast content. In that case, it can be determined that the target camera device is conducting unauthorized live broadcasting. A corresponding live broadcast detection result can be output.

Alternatively, if the changes in the network traffic in the network where the target camera device is located within the detection time do not match the traffic features of the detection content, it can indicate that the detection content captured by the target camera device within the detection time is not part of the live broadcast content and is not broadcasted live. In that case, it can be determined that the target camera device is not conducting unauthorized live broadcasting.

In the above-described embodiments with reference to FIG. 4A, the terminal device can determine the detection time and the detection content before the detection time and the detection content are used. The procedures of determining the detection time and the detection content can be similar to those described above with reference to FIGS. 2A-2D. Reference can be made to the corresponding descriptions above, which are not described in detail here.

Further, the form of the detection content is not limited in the embodiments described herein. Any form of content that can be captured by the target camera device can be used as the detection content. Description of exemplary detection content is provided above with reference to FIGS. 2A-2D, which is not repeated here.

Figure 4B:
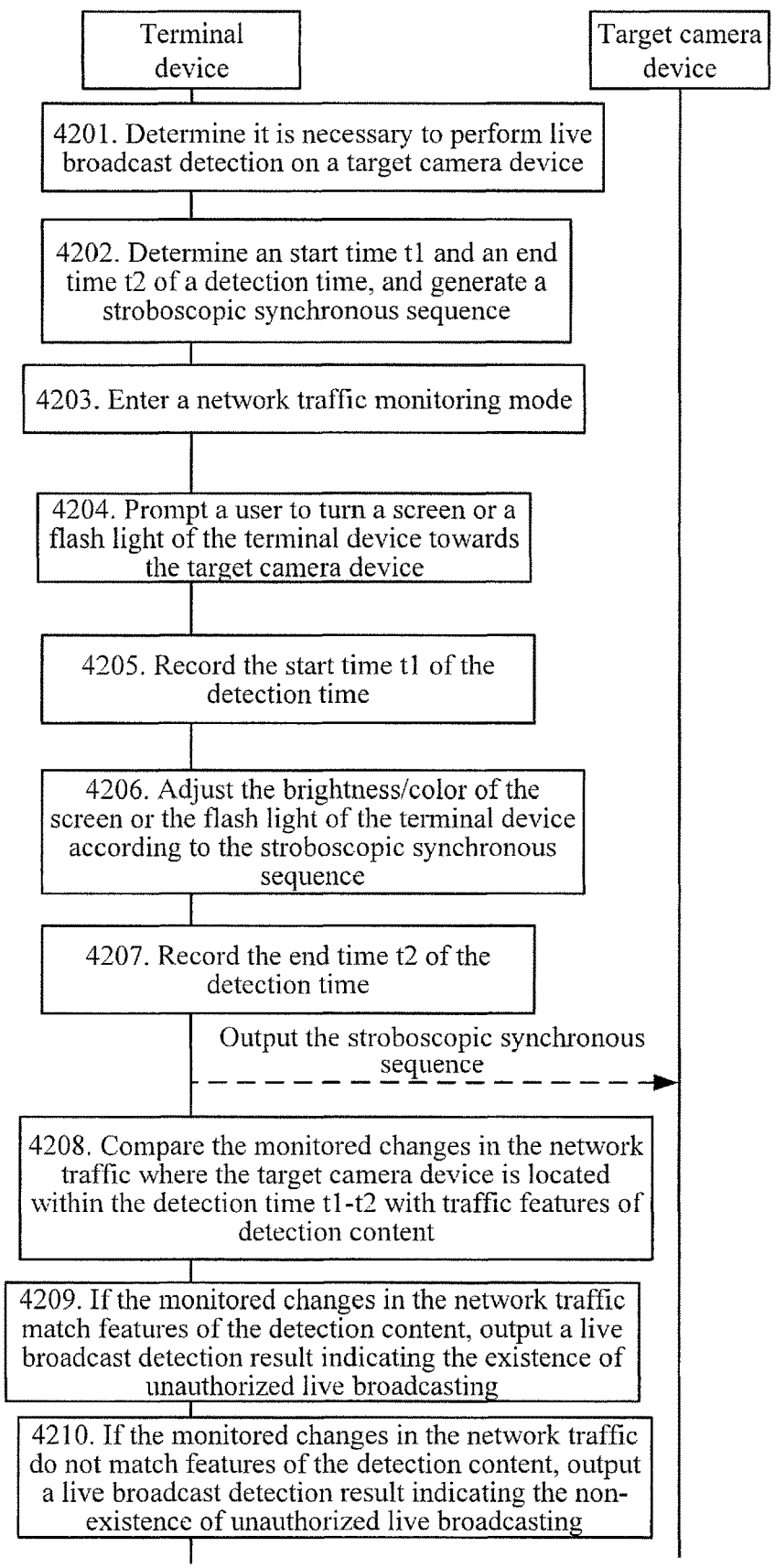
FIG. 4B is an interaction diagram illustrating an exemplary live broadcast detection method according to some embodiments of the present disclosure.

FIG. 4B is an interaction diagram illustrating an exemplary live broadcast detection method 420 according to some embodiments of the present disclosure. Live broadcast detection method is described using a stroboscopic synchronous sequence as the detection content. As shown in FIG. 4B, live broadcast detection method 420 can include the following steps 4201-4210.

In step 4201, a terminal device determines in response to a live broadcast detection trigger operation of a user that it is necessary to perform live broadcast detection on a target camera device.

In step 4202, the terminal device determines a start time t1 and an end time t2 of a detection time, and generates a stroboscopic synchronous sequence.

In step 4203, the terminal device enters a traffic monitoring mode, to prepare for monitoring changes in the network traffic in a network where the target camera device is located.

In step 4204, the terminal device outputs prompt information to prompt the user to turn a screen or a flash light of the terminal device towards the target camera device.

In step 4205, the terminal device records the start time t1 of the detection time.

In step 4206, the brightness/color of the screen or the flash light of the terminal device is adjusted according to the stroboscopic synchronous sequence.

In step 4207, the terminal device records the end time t2 of the detection time.

In step 4208, the terminal device compares the monitored changes in the network traffic in the network where the target camera device is located within the time t1-t2 with traffic features of the detection content.

In step 4209, if the monitored changes in the network traffic within the time t1-t2 match the traffic features of the detection content, the terminal device outputs a live broadcast detection result indicating the existence of unauthorized live broadcasting.

In step 4210, if the monitored changes in the network traffic within the time t1-t2 do not match the traffic features of the detection content, the terminal device outputs a live broadcast detection result indicating the non-existence of unauthorized live broadcasting.

With live broadcast detection method 420, the terminal device cooperates with the target camera device in the detection process, and the terminal device can determine whether the target camera device conducts unauthorized live broadcasting. The determination can be made based on whether the changes in the network traffic in the network where the target camera device is located within the detection time match the traffic features of the detection content. The user can conveniently and timely determine whether the target camera device is conducting unauthorized live broadcasting, and whether he/she is being broadcasted live without his/her authorization. The user can take corresponding measures to prevent or stop the unauthorized live broadcasting. That way, the security of user information can be improved.

In some embodiments described above, a user can initiate live broadcast detection for the target camera device. In some application scenarios, some camera devices are installed in a concealed or hidden manner. The user may not be able to determine whether there is a camera device around. In that case, the user may also be captured and broadcasted live without his or her authorization. In order to ensure the security of user information, data processing methods are further provided in the embodiments of the present disclosure. Some data processing methods can be used to implement unauthorized live broadcast detection in the scenarios where the user cannot determine whether there is a camera device around. For example, some data processing methods can be applied to the live broadcast detection system as shown in FIG. 1A or FIG. 1B, and can be implemented by terminal device 101 and server 103. Exemplary methods are further described below.

Figure 4C:
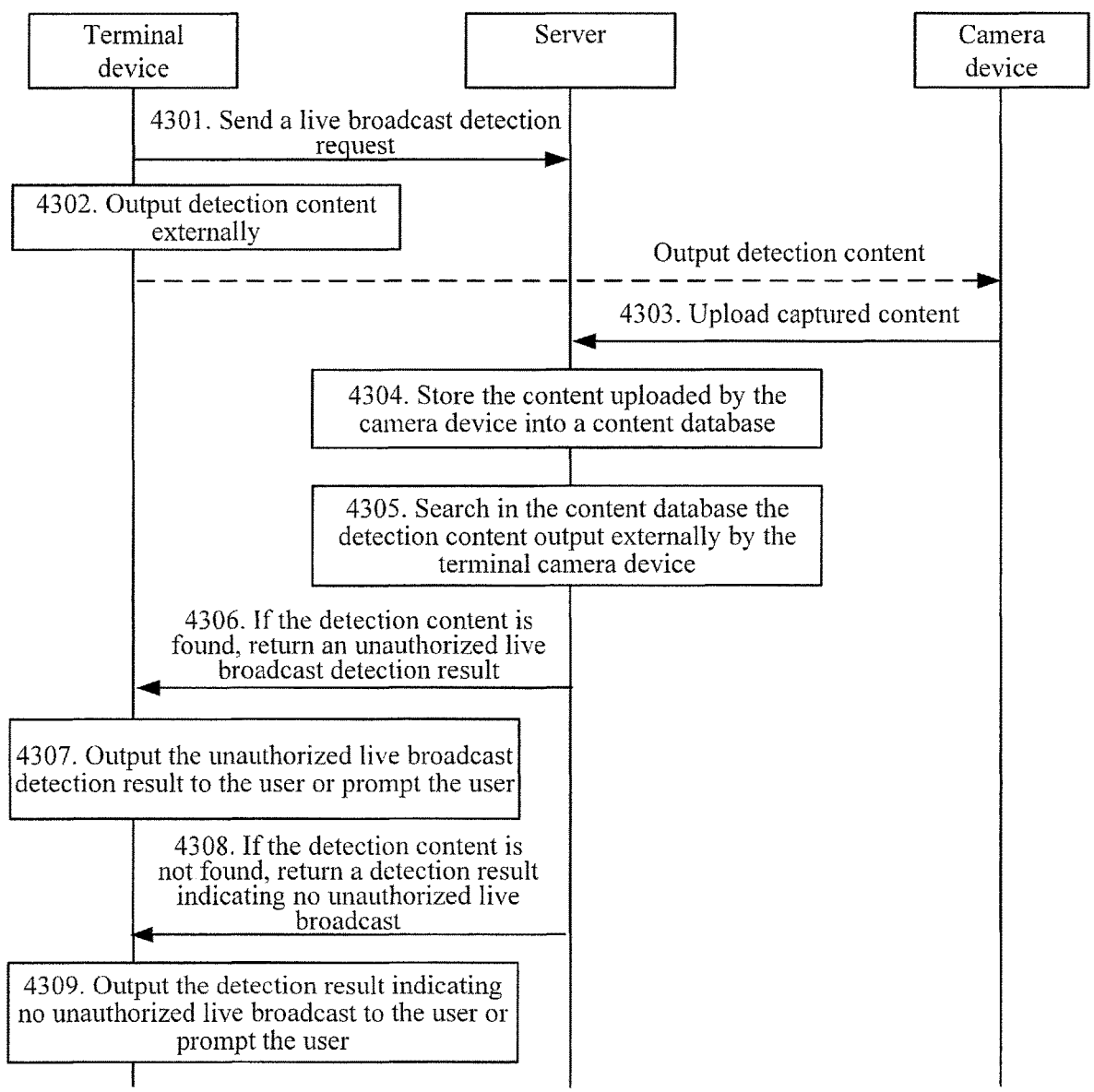
FIG. 4C is an interaction diagram illustrating an exemplary data processing method according to some embodiments of the present disclosure.

FIG. 4C is an interaction diagram illustrating an exemplary data processing method 430 according to some embodiments of the present disclosure. As shown in FIG. 4C, data processing method 430 can include the following steps 4301-4309.

In step 4301, the terminal device sends a detection request to a server to request the server to perform unauthorized live broadcast detection.

In step 4302, the terminal device outputs detection content externally to allow a camera device in a preset range to capture the detection content.

The camera device can be any electronic device such as a camera device that can capture content within a field of view. When the user is in a cafe, a restaurant, an office building, a fitting room, or other environments and suspects that he/she may be captured and broadcasted live without his/her authorization, the user can send a detection request to the server through his/her terminal device. Relevant information of the terminal device, such as an IP address, a MAC address, a registered account on the server, etc., can be carried in the detection request, to allow the server to identify the terminal device from which the user the detection request is sent.

With data processing method 430, the user may not know the existence of the camera device or the location of the camera device. For the user, if he/she suspects that he/she may be captured and broadcasted live unauthorizedly, he/she can send a detection request to the server through his/her terminal device. After that, he/she can output the detection content externally through his/her terminal device to allow the camera device in the preset range to capture the detection content.

If the user knows the existence of the camera device and can determine the location of the camera device, the user can turn his/her terminal device towards the camera device and output the detection content, the process of which is similar to some method embodiments described above. If the user does not know whether there is a camera device, or the user knows that there is a camera device around but cannot determine the location of the camera, when detection content is output externally through his/her terminal device, the detection content can be output at a highly suspicious position through the terminal device, or the detection content can be output within the range of 360 degrees through the terminal device. The preset range may vary according to different user requirements. For example, the range may be within a range of 360 degrees around the user, or a certain position highly suspected by the user, a certain angle range, and so on.

If there is a camera device around the user, the camera device will capture the detection content output by the terminal device. Further, if the camera device works in a live broadcasting mode, it may also upload the captured content to the live broadcast system. In this example, it is assumed that there is a camera device around the user or the terminal device.

In step 4303, the camera device around the terminal device captures content within a field of view, and uploads the content to the server.

In step 4304, the server receives the content uploaded by the camera device, and stores the content in a content database. Content uploaded by each camera device in the live broadcast system can be stored in the content database.

In some embodiments, if the content uploaded by the camera device satisfies the live broadcasting condition, the server may also broadcast live the content over the network in addition to storing the content in the content database. If the content uploaded by the camera device does not satisfy the live broadcasting condition, the content can be stored in the content database.

In step 4305, the server searches, according to the detection request sent by the terminal device, in the content database for the detection content output by the terminal device externally.

In step 4306, if the detection content is found in the content database, an unauthorized live broadcast detection result is returned to the terminal device.

It is appreciated that finding the detection content in the content database may indicate that the user is captured unauthorizedly, but the content captured unauthorizedly is not broadcasted live. For example, this may be because the detection content does not satisfy the live broadcasting condition. Alternatively, finding the detection content in the content database may indicate that the user is captured unauthorizedly and the content captured unauthorizedly is broadcasted live. In the above two situations, the server can return an unauthorized live broadcast detection result to the terminal device without making any distinction between the two situations. Alternatively, the server can distinguish between the two situations and return corresponding detection results to the terminal device. For example, the detection results may include one detection result indicating that the user is captured unauthorizedly but not broadcasted live, and one detection result indicating the user is captured and broadcasted live unauthorizedly.

In step 4307, after receiving the unauthorized live broadcast detection result returned by the server, the terminal device outputs the live broadcast detection result to the user or prompts the user.

If in step 4305, the detection content is not found in the content database, step 4308 can be performed. In step 4308, a detection result indicating that the user is not captured and broadcasted live unauthorizedly is returned to the terminal device.

In some embodiments, if the detection content is not found in the content database, the server may not return any detection result to the terminal device.

In step 4309, after receiving the detection result returned by the server and indicating that the user is not captured and broadcasted live unauthorizedly, the terminal device may output the detection result to the user or prompt the user.

In some embodiments, in step 4302, the terminal device can determine the detection time and the detection content, and then output the detection content externally within the detection time, to allow a potential camera device around to capture the detection content within the detection time. Correspondingly, in step 4305, the server searches in the content database for the detection content captured within the detection time. The combination of the detection content and the detection time can reduce the probability of a conflict between the detection content and content normally captured by the camera device. That way, the accuracy of the live broadcast detection result can be improved.

The procedures of determining the detection time and the detection content and the form of the detection content may be similar to those described above in the live broadcast detection method embodiments. Reference can be made to the corresponding description provided above, and details are not repeated herein. In addition, the procedures regarding the detection approval, determination of the validity of the detection request, and detection on time synchronization performance described above with reference to FIG. 2C, FIG. 2D, and FIG. 3D may also be applicable to the data processing method embodiments, details of which are not repeated here.

Based on data processing method 430 described above, the terminal device can perform the following procedures: sending a detection request to a server to request the server to perform unauthorized live broadcast detection; outputting detection content externally to allow a potential camera device around to capture the detection content; and receiving an unauthorized live broadcast detection result returned when the server finds the detection content in a content database. The server in data processing method 430 can perform the following procedures: receiving a detection request sent by a terminal device; searching for detection content in a content database according to the detection request, the content database storing content uploaded by various camera devices in a live broadcast system; and returning an unauthorized live broadcast detection result to the terminal device if the detection content is found.

In the above-described method embodiments, the procedures to perform live broadcast detection or unauthorized live broadcast detection on the target camera device are described. Other types of detection can also be performed on the target camera device in addition to performing live broadcast detection or unauthorized live broadcast detection. In some embodiments, the type of an appropriate camera device can be set in advance based on the application scenario, detection requirements, and the content to be detected. Various types of detection initiated for the target camera device can be implemented by determining whether the target camera device belongs to a preset-type camera device.

The type of the camera device can be set flexibly in advance according to different application scenarios and detection requirements. For example, when unauthorized live broadcast detection is performed for the target camera device, the type of the camera device can be set in advance as an unauthorized live broadcast type.

In view of the above, data processing methods are further provided in the present disclosure. According to some embodiments, one exemplary data processing method can include: acquiring one or more pieces of image data of a target camera device; calculating a similarity between the one or more pieces of image data and reference image data; comparing the similarity with a preset threshold; and determining that the target camera device is a preset-type camera device if the similarity exceeds the preset threshold.

The procedures of acquiring the one or more pieces of image data of the target camera device, the content of the above reference image data, and the procedures of obtaining the reference image data may also vary according to different application scenarios and detection requirements. For example, when unauthorized live broadcast detection is performed for the target camera device, the reference image data may be a synchronous stroboscopic sequence, and the reference image data may be generated by the server or the terminal device and provided to each other.

In some embodiments, the above method can be performed periodically according to different application scenarios and detection requirements, to determine whether the target camera device is a preset-type camera device. Alternatively, the above method can also be performed at a preset detection time to determine whether the target camera device is a preset-type camera device. Further, the above method can also be performed according to a user requirement or a request initiated by the target device to determine whether the target camera device is a preset-type camera device.

In some application scenarios, after determining that the target camera device is a preset-type camera device, an instruction can be sent to the target camera device to disable the target camera device. For example, in a scenario where live broadcast detection or unauthorized live broadcast detection is performed for the target camera device, the target camera device is disabled when it is determined that the target camera device is an unauthorized live broadcast type camera device. That way, the security of user information can be improved.

In some application scenarios, after determining that the target camera device is a preset-type camera device, an instruction can be sent to the terminal device. The instruction can be configured to prompt the user that the target camera device is a preset-type camera device. The user can take corresponding measures to protect the security of user information.

In some embodiments, the above method embodiments can be performed by a computer device. The computer device can be a server or a terminal device. For example, the computer device can be a server. The server can acquire one or more pieces of image data of the target camera device when detecting the target camera device. The server can calculate the similarity between the one or more pieces of image data and reference image data and determine that the target camera device is a preset-type camera device if the similarity exceeds a preset threshold.

According to some embodiments of the present disclosure, computer devices are further provided. One exemplary computer device can include a memory and a processor. The memory can be configured to store a computer program. The processor can be configured to execute the computer program to: acquire one or more pieces of image data of a target camera device; calculate the similarity between the one or more pieces of image data and reference image data; and determine that the target camera device is a preset-type camera device if the similarity exceeds a preset threshold.

In some embodiments, the computer device can further include a communication component. The communication component can be configured to send an instruction to the target camera device when the target camera device is a preset-type camera device. The instruction can be configured to disable the target camera device. The communication component can be further configured to send an instruction to the terminal device when the target camera device is a preset-type camera device. The instruction can be configured to prompt the user that the target camera device is a preset-type camera device.

Further, in some embodiments, the computer device can further include one or more of the following components: a screen, a power supply component, an audio component, and so on. It is appreciated that the computer device may include less or more than the above components. The memory, the communication component, the screen, the power supply component, the audio component, and so on are further described in the following.

Correspondingly, computer-readable storage mediums storing a computer program are further provided. When the computer program is executed, the procedures or operations described above in the data processing method embodiments can be implemented.

The above embodiments and drawings may include a plurality of procedures in a particular order. It is appreciated that, the procedures can be performed in an order different from those described above or can be performed in parallel. The reference numbers do not represent any mandatory execution order. In addition, the procedures can include more or fewer procedures, which can also be executed sequentially or in parallel. It should be appreciated the terms such as "first" and "second" used herein are used to distinguish different elements. These terms do not represent any particular order, and the elements described may be the same or different types of elements.

Figure 5A:
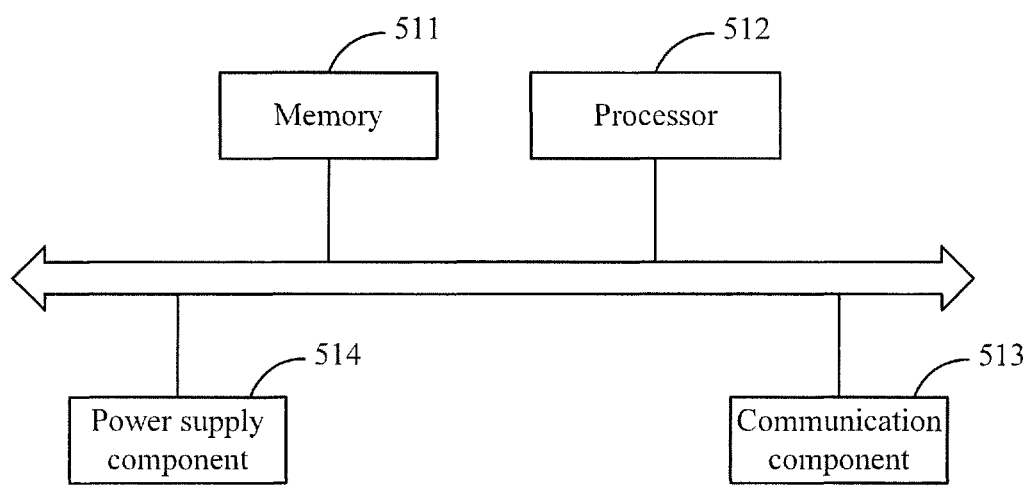
FIG. 5A is a schematic structural diagram of an exemplary server according to some embodiments of the present disclosure.

FIG. 5A is a schematic structural diagram of an exemplary server 510 according to some embodiments of the present disclosure. As shown in FIG. 5A, server 510 can include a memory 511, a processor 512, a communication component 513, and a power supply component 514.

Memory 511 can be configured to store a computer program and other various data to support operations on the server. Examples of the stored data can include instruction(s) for applications or methods operating on the server, contact data, phone book data, messages, pictures, video, and so on.

Processor 512 can be coupled to memory 511, and can be configured to perform the computer program stored in memory 511 to perform the following procedures: receiving a live broadcast detection request sent by a terminal device through communication component 513, the live broadcast detection request being configured to request the server to perform live broadcast detection on a target camera device; search for detection content in live broadcast content uploaded by the target camera device; and if the detection content is found, return a live broadcast detection result to the terminal device through communication component 513.

Communication component 513 can be configured to receive the live broadcast detection request sent by the terminal device and receive the live broadcast content uploaded by the target camera device.

In some embodiments, when searching for the detection content, processor 512 can be configured to: determine a detection time and detection content; and search for the detection content captured within the detection time in the live broadcast content uploaded by the target camera device.

In some embodiments, when determining the detection time and the detection content, processor 512 can be configured to: receive the detection content and information about the detection time sent by the terminal device through communication component 513. Correspondingly, communication component 513 can be further configured to: receive the detection content and the information about the detection time sent by the terminal device.

In some embodiments, when determining the detection time and the detection content, processor 512 can be configured to: determine information about the detection time with reference to the current time; and generate the detection content according to a key of the target camera device and the information about the detection time. In addition, processor 512 can be further configured to: send the detection content and the information about the detection time to the terminal device through communication component 513. For example, this may allow the user to turn towards the target camera device and output the detection content within the detection time. Correspondingly, communication component 513 can be further configured to: send the detection content and the information about the detection time to the terminal device.

In some embodiments, before searching for the detection content, processor 512 can be further configured to: send a detection approval message to the terminal device to allow the terminal device to initiate a detection action.

In some embodiments, processor 512 can be further configured to: stop broadcasting the live broadcast content uploaded by the target camera device if the detection content is found in the live broadcast content uploaded by the target camera device.

In some embodiments, before searching for the detection content, processor 512 can be further configured to: determine according to information about the target camera device or the terminal device that the live broadcast detection request is a valid request.

Further, when determining according to information about the target camera device and the terminal device that the live broadcast detection request is a valid request, processor 512 can be further configured to: determine that the live broadcast detection request is a valid request when the target camera device is a contracted camera device or the location of the terminal device is consistent with the installation location of the target camera device.

In some embodiments, processor 512 can be further configured to: before searching for the detection content, send a synchronization request message to the terminal device; receive a synchronization acknowledgment message returned by the terminal device; and determine according to the synchronization request message and the synchronization acknowledgment message that a time delay between a local terminal and the terminal device is within a synchronization error range.

Further, as shown in FIG. 5A, server 510 may further include power supply component 514. Server 510 may also include other components. It is appreciated that FIG. 5A only illustrates an exemplary structure of server 510, the configuration of which may vary.

Correspondingly, computer-readable storage mediums storing a computer program are further provided. When the computer program is executed, the procedures or operations described above with reference to FIG. 5A can be implemented.

Figure 5B:
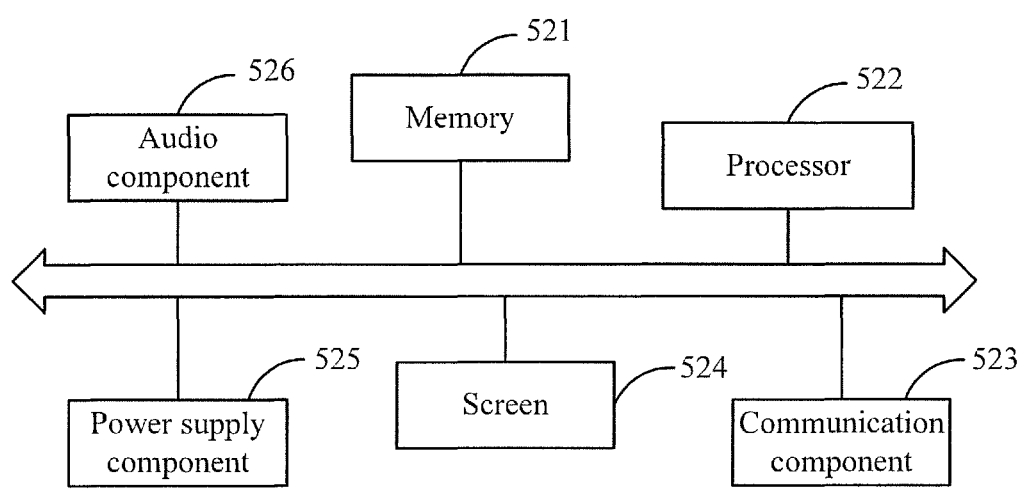
FIG. 5B is a schematic structural diagram of an exemplary terminal device according to some embodiments of the present disclosure.

FIG. 5B is a schematic structural diagram of an exemplary terminal device 520 according to some embodiments of the present disclosure. As shown in FIG. 5B, terminal device 520 can include: a memory 521, a processor 522, a communication component 523, a screen 524, a power supply component 525, and an audio component 526.

Memory 521 can be configured to store a computer program and can be configured to store other various data to support operations on the terminal device. Examples of the data include an instruction for any application or method operating on the terminal device, contact data, phone book data, messages, pictures, video, and so on.

Processor 522 can be coupled to memory 521, and can be configured to execute the computer program stored in memory 521 to: send a live broadcast detection request to a server in a live broadcast system through communication component 523 to request the server to perform live broadcast detection on a target camera device; face towards the target camera device and output detection content, thus allowing the target camera device to capture the detection content; and receive, through communication component 523, a live broadcast detection result returned by the server. The live broadcast detection result can be generated when the server finds the detection content in the live broadcast content uploaded by the target camera device, or when the server receives a search result reported by the target camera device indicating that the captured detection content is found in the captured live broadcast content.

In some embodiments, when outputting the detection content, processor 522 can be configured to: determine a detection time and detection content; and face towards the target camera device and output the detection content within the detection time, thus allowing the target camera device to capture the detection content within the detection time.

In some embodiments, the detection content can be a stroboscopic synchronous sequence. Based on this, when outputting the detection content, processor 522 can be configured to: output first prompt information to prompt a user to turn a screen or a flash light of the terminal device towards the target camera device; and adjust, according to a frequency of the stroboscopic synchronous sequence, a visual attribute of the screen or the flash light within the detection time to output the stroboscopic synchronous sequence to the target camera device.

In some embodiments, the detection content can be electronic data that can be displayed on a screen of the terminal device. Based on this, when outputting the detection content, processor 522 can be configured to: display the detection content on a screen of the terminal device in response to a display operation of the user; and turn the screen of the terminal device towards the target camera device within the detection time. In some embodiments, the above detection content can include, but is not limited to, an information code uniquely corresponding to the user, a photo of the user, or video content including the user.

In some embodiments, the detection content can be non-electronic data that can be carried by a physical carrier. Based on this, when outputting the detection content, processor 522 can be configured to: output second prompt information to prompt a user to turn the physical carrier towards the target camera device within the detection time, to output the detection content to the target camera device within the detection time.

In some embodiments, when determining the detection time and detection content, processor 522 can be configured to: determine information about the detection time with reference to the current time; and generate the detection content according to a key of the target camera device and the information about the detection time. Alternatively, process 522 can be configured to: receive the detection content and the information about the detection time sent by the server.

In some embodiments, processor 522 can be configured to: after the detection content is generated, send the detection content and the information about the detection time to the server through communication component 523. Correspondingly, communication component 523 can be further configured to send the detection content and the information about the detection time to the server.

In some embodiments, processor 522 can be further configured to: before turning towards the target camera device and outputting detection content, receive a synchronization request message sent by the server through communication component 523; and return a synchronization acknowledgment message to the server through communication component 523, to allow the server in the live broadcast system to determine whether a time delay between the two ends is within a time synchronization error range.

In some embodiments, processor 522 can be further configured to: before turning towards the target camera device and outputting detection content, receive a detection approval message returned by the server through communication component 523.

In some embodiments, the above server can be a live broadcasting server in the live broadcast system, or a content distribution server in the live broadcast system.

Further, as shown in FIG. 5B, terminal device 520 can further include screen 524, power component 525, and audio component 526. Terminal device 520 can also include other components. It is appreciated that FIG. 5B merely schematically provides some components in an exemplary structure.

According to some embodiments of the present disclosure, computer-readable storage mediums storing a computer program are further provided. When the computer program is executed, the procedures or operations described above with reference to FIG. 5B can be implemented.

In some embodiments, live broadcast detection systems are further provided in the present disclosure. An exemplary live broadcast detection system can include: terminal device 520 as shown in FIG. 5B, and server 510 as shown in FIG. 5A, and the camera device described above. Terminal device 520, server 510, and the camera device can cooperate and perform the procedures described above with reference to FIGS. 2A-2D. Reference can be made the corresponding description provided above.

Figure 6A:
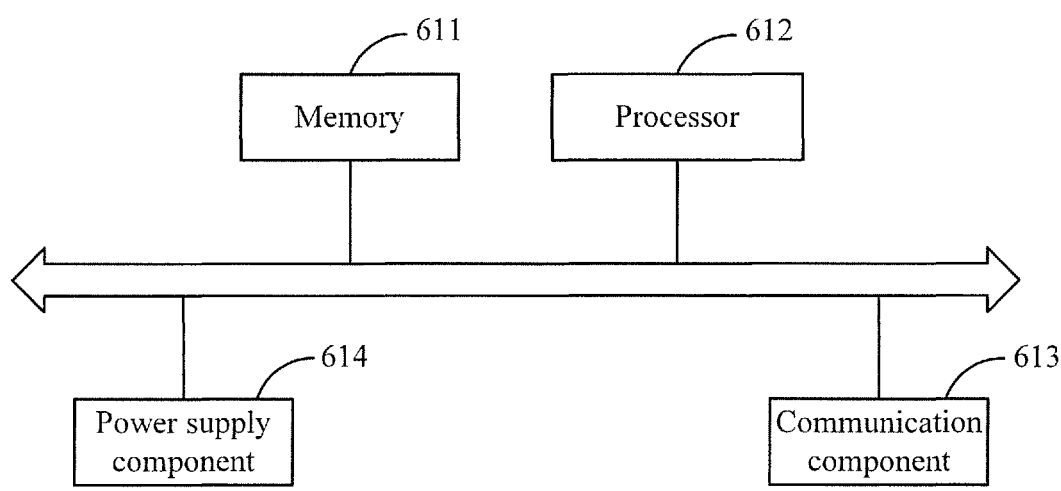
FIG. 6A is a schematic structural diagram of an exemplary server according to some embodiments of the present disclosure.

FIG. 6A is a schematic structural diagram of an exemplary server 610 according to some embodiments of the present disclosure. As shown in FIG. 6A, server 610 can include: a memory 611, a processor 612, a communication component 613, and power supply component 614.

Memory 611 can be configured to store a computer program, and other various data to support operations on the server. Examples of the data can include instruction(s) for applications or methods operating on the server, contact data, phone book data, messages, pictures, video data, and so on.

Processor 612 can be coupled to memory 611, and can be configured to perform the computer program stored in memory 611 to perform the following procedures: receiving a live broadcast detection request sent by a terminal device through communication component 613, the live broadcast detection request being configured to request the server to perform live broadcast detection on a target camera device; send detection content to the target camera device through communication component 613 to allow the target camera device to search for the detection content in captured live broadcast content; and return a live broadcast detection result to the terminal device when receiving a search result reported by the target camera device indicating that the detection content is found in the captured live broadcast content through communication component 613. Correspondingly, communication component 613 can be configured to: receive the live broadcast detection request sent by the terminal device; send the detection content to the target camera device; and receive the search result reported by the target camera device indicating that the detection content is found in the captured live broadcast content.

In some embodiments, when sending the detection content to the target camera device, processor 612 can be further configured to: determine detection content and information about a detection time; and send the detection content and the information about the detection time to the target camera device, to allow the target camera device to search for detection content captured within capturing time in the captured live broadcast content.

In some embodiments, when determining detection content and information about detection time, processor 612 can be configured to: receive, through communication component 613, the detection content and the information about the detection time sent by the terminal device. Correspondingly, communication component 613 can be further configured to: receive the detection content and the information about the detection time sent by the terminal device.

In some embodiments, when determining the detection content and information about the detection time, processor 612 can be configured to: determine information about the detection time with reference to the current time; and generate the detection content according to a key of the target camera device and the information about the detection time.

In some embodiments, processor 612 can be further configured to send the detection content and the information about the detection time to the terminal device through communication component 613, thus allowing the user to face towards the target camera device and output the detection content within the detection time. Correspondingly, communication component 613 can be further configured to send the detection content and the information about the detection time to the terminal device.

In some embodiments, processor 612 can be further configured to: before the detection content is sent to the target camera device, send a detection approval message to the terminal device to allow the terminal device to initiate a detection action.

In some embodiments, processor 612 can be further configured to: stop broadcasting the live broadcast content uploaded by the target camera device, when a search result reported by the target camera device indicating that the detection content is found in the captured live broadcast content is received.

In some embodiments, processor 612 can be further configured to: before the detection content is sent to the target camera device, determine according to information about the target camera device or the terminal device that the live broadcast detection request is a valid request.

In some embodiments, processor 612 can be configured to: determine that the live broadcast detection request is a valid request, when the target camera device is a contracted camera device or the location of the terminal device is consistent with the installation location of the target camera device.

In some embodiments, processor 612 can be configured to: before the detection content is sent to the target camera device, send a synchronization request message to the terminal device; receive a synchronization acknowledgment message returned by the terminal device; and determine according to the synchronization request message and the synchronization acknowledgment message that a time delay between a local terminal and the terminal device is within a synchronization error range.

Further, as shown in FIG. 6A, server 610 can further include power supply component 614 and can also include other components. It is appreciated that FIG. 6A merely schematically provides some components in an exemplary structure. Actual configuration may vary.

According to some embodiments of the present disclosure, computer-readable storage mediums storing a computer program are further provided. When the computer program is executed, the procedures or operations described above with reference to FIG. 6A can be implemented.

Figure 6B:
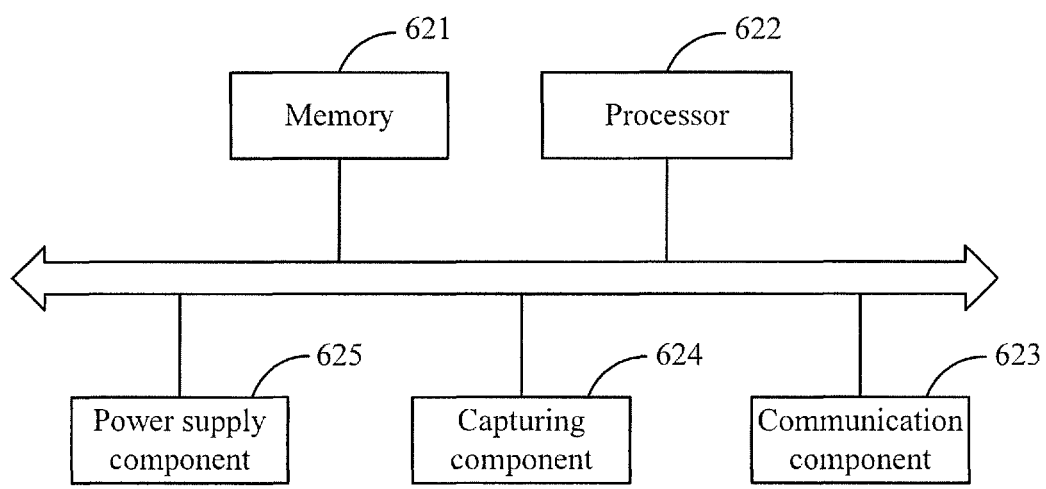
FIG. 6B is a schematic structural diagram of an exemplary camera device according to some embodiments of the present disclosure.

FIG. 6B is a schematic structural diagram of an exemplary camera device 620 according to some embodiments of the present disclosure. As shown in FIG. 6B, camera device 620 can include: a memory 621, a processor 622, a communication component 623, a capturing component 624, and a power supply component 625.

Capturing component 623 can be configured to capture content within a field of view of the camera device.

Memory 621 can be configured to store a computer program, and other various data to support operations on the camera device. Examples of the data include instruction(s) for any application(s) or method(s) operating on the camera device, contact data, phone book data, pictures, images, video data, and so on.

Processor 622 can be coupled to memory 621, and can be configured to execute the computer program stored in memory 621 to perform the following procedures: receiving detection content sent by a server through communication component 623; search for the detection content in live broadcast content captured by capturing component 624; and when the detection content is found in the live broadcast content captured by capturing component 624, report, through communication component 623, to the server a search result indicating that the detection content is found in the captured live broadcast content. The server can return a live broadcast detection result to the terminal device.

In some embodiments, processor 622 can be configured to: receive detection content and information about a detection time sent by the server through communication component 623; search for the detection content captured within capturing time in the live broadcast content captured by capturing component 624; and when the detection content captured within the capturing time is found in the live broadcast content captured by the capturing component 624, report, through communication component 623, to the server the search result indicating that the detection content captured within the capturing time is found in the captured live broadcast content.

Further, as shown in FIG. 6B, the camera device can further include power supply component 625, and can also include other components. It is appreciated that FIG. 6B merely schematically provides some components in an exemplary structure.

According to some embodiments of the present disclosure, computer-readable storage mediums storing a computer program are further provided. When the computer program is executed, the procedures or operations described above with reference to FIG. 6B can be implemented.

In some embodiments, live broadcast detection systems are further provided. An exemplary live broadcast detection system can include terminal device 520 as shown in FIG. 5B, camera device 620 as shown in FIG. 6B, and server 610 as shown in FIG. 6A. Terminal device 520, camera device 620, and server 610 can cooperate and perform the procedures described above with reference to FIGS. 3A-3D. Reference can be made the corresponding description provided above.

Figure 7:
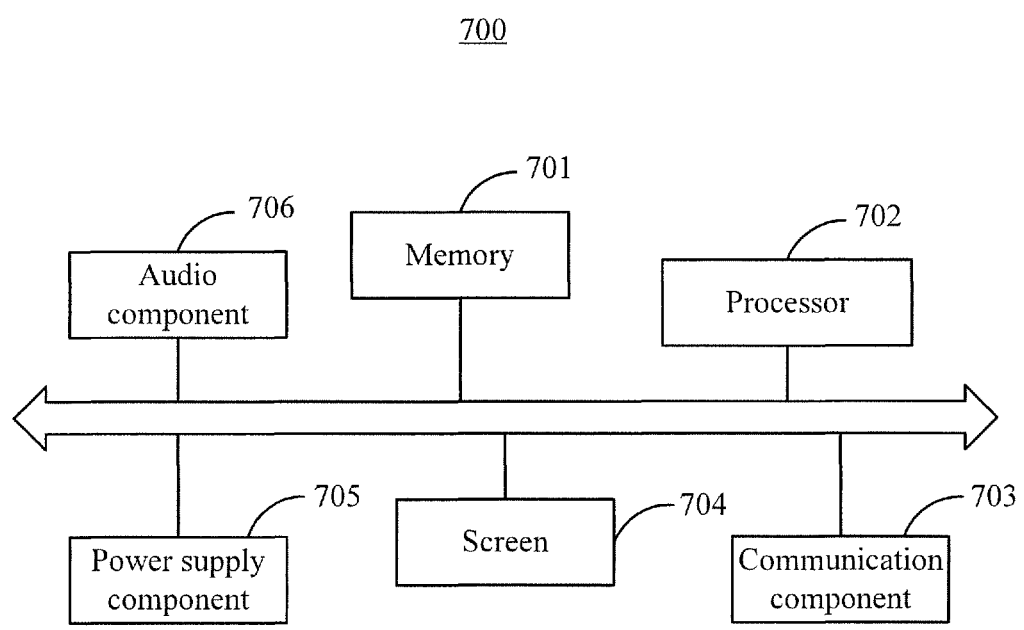
FIG. 7 is a schematic structural diagram of an exemplary terminal device according to some embodiments of the present disclosure.

FIG. 7 is a schematic structural diagram of an exemplary terminal device 700 according to some embodiments of the present disclosure. As shown in FIG. 7, terminal device 700 can include: a memory 701, a processor 702, a communication component 703, a screen 704, a power supply component 705, and an audio component 706.

Memory 701 can be configured to store a computer program and other various data to support operations on the terminal device. Examples of the data include an instruction(s) for applications or methods operating on the terminal device, contact data, phone book data, messages, pictures, video data, and so on.

Processor 702 can be coupled to memory 701, and can be configured to execute the computer program stored in memory 701 to perform the following procedures: determining in response to a live broadcast detection trigger operation that it is necessary to perform live broadcast detection on a target camera device; facing towards the target camera device and outputting detection content, thus allowing the target camera device to capture the detection content; monitoring changes in network traffic in a network where the target camera device is located; and outputting a live broadcast detection result if the changes in the network traffic match traffic features of the detection content.

In some embodiments, processor 702 can be further configured to: determine a detection time and detection content; face towards the target camera device and output the detection content within the detection time, thus allowing the target camera device to capture the detection content within the detection time; monitor changes in network traffic in a network where the target camera device is located; and output a live broadcast detection result if the changes in the network traffic match traffic features of the detection content.

In some embodiments, processor 702 can be further configured to: output a detection result indicating that the user is not being broadcasted live unauthorizedly when the changes in the network traffic where the target camera device is located do not match the traffic features of the detection content.

In some embodiments, the detection content can be a stroboscopic synchronous sequence. When outputting the detection content, processor 702 can be configured to: output first prompt information to prompt a user to turn a screen or a flash light of the terminal device towards the target camera device; and adjust, according to the frequency of the stroboscopic synchronous sequence, a visual attribute of the screen or the flash light within the detection time to output the stroboscopic synchronous sequence to the target camera device.

In some embodiments, the detection content can be electronic data that can be displayed on a screen of the terminal device. When outputting the detection content, processor 702 can be configured to: display the detection content on a screen of the terminal device in response to a display operation of the user, and turn the screen of the terminal device towards the target camera device within the detection time. In some embodiments, the above detection content can also include, but is not limited to, an information code uniquely corresponding to the user, a photo of the user, or video content including the user.

In some embodiments, the detection content can be content that can be carried by a physical carrier. When outputting the detection content, processor 702 can be configured to: output second prompt information to prompt the user to turn the physical carrier towards the target camera device within the detection time to output the detection content to the target camera device within the detection time.

In some embodiments, processor 702 can be further configured to: before turning towards the target camera device and outputting the detection content within the detection time, determine information about the detection time with reference to the current time; and generate the detection content according to a key of the target camera device and the information about the detection time.

Further, as shown in FIG. 7, terminal device 700 can also include: communication component 703, screen 704, power supply component 705, and audio component 706. Terminal device 700 can also include other components. It is appreciated that FIG. 7 merely schematically provides some components in an exemplary structure.

According to some embodiments of the present disclosure, computer-readable storage mediums storing a computer program are further provided. When the computer program is executed, the procedures or operations described above with reference to FIG. 7 can be implemented.

Further, live broadcast detection systems are further provided in the present disclosure. One exemplary live broadcast detection system includes: a terminal device (such as terminal device 700) and a camera device. The terminal device and the camera device can cooperate and perform the procedures described above with reference to FIG. 4A-4C. Reference can be made the corresponding description provided above.

Figure 8A:
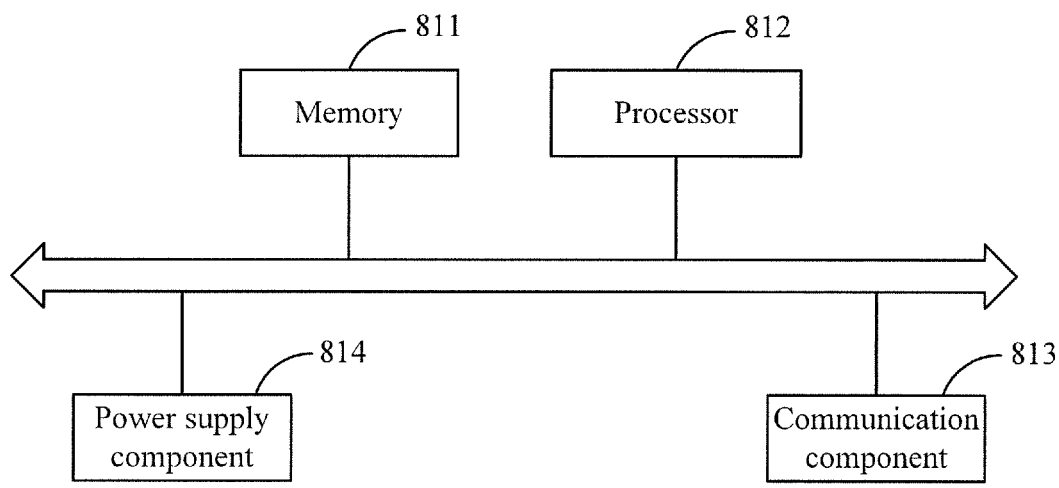
FIG. 8A is a schematic structural diagram of an exemplary server according to some embodiments of the present disclosure.

FIG. 8A is a schematic structural diagram of an exemplary server 810 according to some embodiments of the present disclosure. As shown in FIG. 8A, server 810 includes: a memory 811, a processor 812, a communication component 813, and a power supply component 814.

Memory 811 can be configured to store a computer program and other various data to support operations on the server. Examples of the data include instruction(s) for applications or methods operating on the server, contact data, phone book data, messages, pictures, video data, and so on.

Processor 812 can be coupled to memory 811, and can be configured to perform the computer program stored in memory 811 to: receive a detection request sent by a terminal device through communication component 813; search for detection content in a content database according to the detection request, the content database storing content uploaded by various camera devices in a live broadcast system; and return an unauthorized live broadcast detection result to the terminal device if the detection content is found.

Further, as shown in FIG. 8A, server 810 can further include power supply component 814 and can also include other components. It is appreciated that FIG. 8A merely schematically provides some components in an exemplary structure.

According to some embodiments of the present disclosure, computer-readable storage mediums storing a computer program are further provided. When the computer program is executed, the procedures or operations performed that can be performed by a server in the data processing method embodiments described above can be implemented.

Figure 8B:
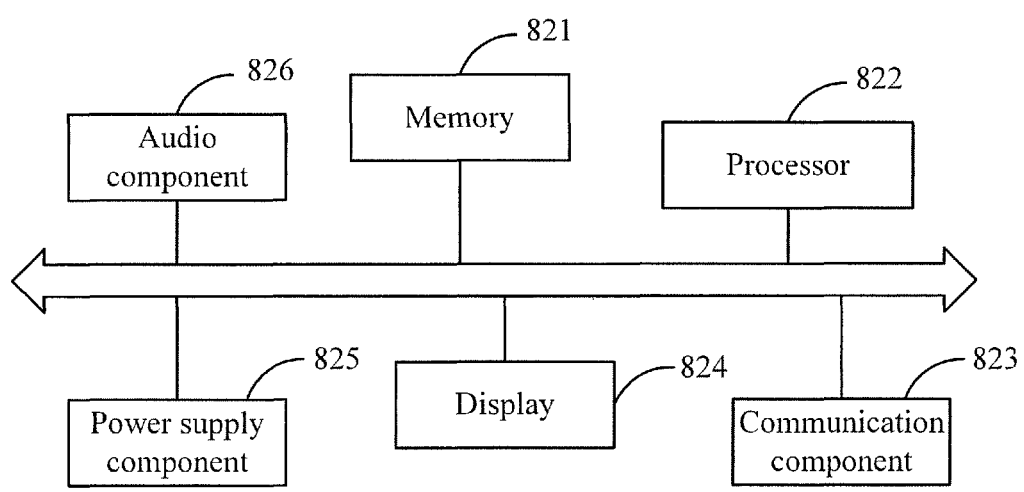
FIG. 8B is a schematic structural diagram of an exemplary terminal device according to some embodiments of the present disclosure.

FIG. 8B is a schematic structural diagram of an exemplary terminal device 820 according to some embodiments of the present disclosure. As shown in FIG. 8B, the terminal device includes: a memory 821, a processor 822, a communication component 823, a display 824, a power supply component 825, and an audio component 826.

Memory 821 can be configured to store a computer program and other various data to support operations on the terminal device. Examples of the data include instruction(s) for applications or methods operating on the terminal device, contact data, phone book data, messages, pictures, video data, and so on.

Processor 822 can be coupled to memory 821, and can be configured to perform the computer program stored in memory 821 to: send a detection request to a server through communication component 823 to request the server to perform unauthorized live broadcast detection; output detection content externally to allow a potential camera device around to capture the detection content; and receive, through communication component 823, an unauthorized live broadcast detection result when the server finds the detection content in a content database.

Further, as shown in FIG. 8B, terminal device 820 can further include: screen 824, power supply component 825, audio component 826. Terminal device 820 can also include other components. It is appreciated that FIG. 8B merely schematically provides some components in an exemplary structure.

According to some embodiments of the present disclosure, computer-readable storage mediums storing a computer program are further provided. When the computer program is executed, the procedures or operations that can be performed by a terminal device in the data processing method embodiments described above can be implemented.

The memory described above with reference to FIG. 5A to FIG. 8B above can be implemented by any type of volatile or non-volatile storage devices or a combination of them, for example, a static random access memory (SRAM), an electrically erasable programmable read-only memory (EEPROM), an erasable programmable read-only memory (EPROM), a programmable read-only memory (ROM), a read-only memory (ROM), a magnetic memory, a flash memory, a magnetic disk, or an optical disc.

The communication component described above with reference to FIG. 5A to FIG. 8B above can be configured to facilitate wired or wireless communication between a device where the communication component is located and another device. The device where the communication component is located can be connected to a communication-standard based wireless network, for example, WiFi, 2G, 3G, 4G, or 5G, or a combination of them. In some embodiments, the communication component can receive a broadcast signal or broadcast related information from an external broadcast management system via a broadcast channel. In some embodiments, the communication component can further include a near field communication (NFC) module to facilitate short-range communications. For example, the NFC module can be implemented based on a radio frequency identification (RFID) technology, an infrared data association (IrDA) technology, an ultra-broadband (UWB) technology, a Bluetooth (BT) technology, and other technologies.

The screen described above with reference to FIG. 5A to FIG. 8B above can include, for example, a liquid crystal display (LCD) and a touch panel (TP). If the screen includes a touch panel, the screen can be implemented as a touch screen to receive an input signal from a user. The touch panel can include one or more touch sensors to sense touches, slides, and gestures on the touch panel. The touch sensor may not only sense the boundary associated with a touch or slide action, but also detect the duration and pressure associated with the touch or slide operation.

The power supply component described above with reference to FIG. 5A to FIG. 8B above can supply power for various components in the device where the power supply component is located. The power supply component can include a power management system, one or more power supplies, and other components associated with power generation, management, and distribution.

The audio component described above with reference FIG. 5A to FIG. 8B can be configured to output or input audio signals. For example, the audio component can include a microphone (MIC) that is configured to receive an external audio signal when the device in which the audio component is located is in an operating mode. The operating mode can include, for example, a calling mode, a recording mode, and a voice recognition mode. The received audio signal can be further stored in a memory or transmitted by the communication component. In some embodiments, the audio component can further include a speaker configured to output an audio signal.

It is appreciated that the embodiments of the present disclosure can be provided as a method, a system, or a computer program product. For example, some embodiments can be implemented in the form of a complete hardware embodiment, a complete software embodiment, or an embodiment combining software and hardware. Further, some embodiments can be in the form of a computer program product implemented through one or more computer-usable storage media including computer-usable program codes. The computer-usable codes can be used for instructing a computer device or a processor (such as CPU) to perform some or all of the steps of the method embodiments of the present disclosure. The computer device may be a personal computer, a server, or a network device. The foregoing storage medium can include any medium that can store program codes, such as a USB flash drive, a mobile hard disk, a Read-Only Memory (ROM), a Random Access Memory (RAM), a magnetic disk, or an optical disc. The storage medium can be a non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

Several embodiments of the present disclosure are described above with reference to flowcharts or block diagrams illustrating exemplary methods, devices (systems) and computer program products. It is appreciated that computer program instructions may be used to implement one or more processes or blocks in the flowcharts or block diagrams and combinations of processes or blocks in the flowcharts or block diagrams. The computer program instructions may be provided to a computer, a special-purpose computer, an embedded processor, or a processor of another programmable data processing device to generate a machine. When the computer program instructions are executed, the computer or the processor of another programmable data processing can perform functions described in one or more processes in the flowcharts or one or more blocks in the block diagrams.

The computer program instructions may also be stored in a computer-readable storage that can guide the computer or another programmable data processing device to work in a certain manner, such that the instructions stored in the computer-readable storage generate an article of manufacture or an apparatus. The apparatus can implement functions described in one or more processes in the flowcharts or one or more blocks in the block diagrams.

The computer program instructions may also be loaded to the computer or another programmable data processing device, such that a series of operation steps can be executed on the computer or another programmable device. The instructions executed in the computer or another programmable device can provide steps for implementing functions described in one or more processes in the flowcharts or one or more blocks in the block diagrams.

For example, the above-mentioned computer or computing device can include one or more central processing units (CPUs), an input/output interface, a network interface, and a memory. As one exemplary form of computer-readable medium, the memory can include computer-readable media such as a volatile memory, a Random Access Memory (RAM), or non-volatile memory, e.g., a Read-Only Memory (ROM) or a flash RAM.

Further, the computer-readable medium can include non-volatile and volatile media as well as movable and non-movable media and can implement information storage. The information can be computer-readable instruction(s), data structure(s), and module(s) of a program, or other data. Examples of the storage medium can include, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. As used herein, the computer-readable medium does not include transitory media, such as a modulated data signal and a carrier.

It should be appreciated that the terms "include," "comprise," or other variations thereof are intended to cover non-exclusive inclusion. That is, a process, method, commodity, or device including a series of elements can not only include those elements, but also include other elements not clearly listed, or further include elements inherent to the process, method, commodity, or device. In the absence of explicit limitations, an element defined by "including a/an . . . " does not exclude that the process, method, commodity or device including other elements besides those listed therein.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments are only exemplary. Consistent with the present disclosure, those of ordinary skill in the art may incorporate variations and modifications in actual implementation, without departing from the principles of the present disclosure. Such variations and modifications shall all fall within the protection scope of the present disclosure.

The invention claimed is:

1. A live broadcast detection method performed by a server, comprising:
   receiving a live broadcast detection request for performing live broadcast detection on a target camera device;
   sending a synchronization request message to a terminal device;
   receiving a synchronization acknowledgment message returned by the terminal device;
   determining, according to the synchronization request message and the synchronization acknowledgment message, that a time delay between the server and the terminal device is within a synchronization error range;
   searching for detection content in live broadcast content uploaded by the target camera device, wherein the detection content is outputted by the terminal device at a detection time and provided for being captured by the target camera device; and
   in response to the detection content being found to be captured at the detection time in the live broadcast content, returning a live broadcast detection result to the terminal device.

2. The method of claim 1, wherein searching for the detection content in the live broadcast content uploaded by the target camera device comprises:
   determining the detection time and the detection content; and
   searching for the detection content captured at the detection time in the live broadcast content.

3. The method of claim 2, wherein determining the detection time and the detection content comprises:
   receiving, from the terminal device, the detection content and information about the detection time.

4. The method of claim 2, wherein determining the detection time and the detection content comprises:
   determining information about the detection time with reference to a current time; and
   generating the detection content according to a key associated with the target camera device and the information about the detection time.

5. The method of claim 4, wherein before searching for the detection content captured at the detection time in the live broadcast content, the method further comprises:
   sending the detection content and the information about the detection time to the terminal device.

6. The method of claim 1, wherein before searching for the detection content in the live broadcast content uploaded by the target camera device, the method further comprises:
   sending a detection approval message to the terminal device.

7. The method of claim 1, further comprising:
   in response to the detection content being found in the live broadcast content, stopping broadcasting the live broadcast content uploaded by the target camera device.

8. The method of claim 1, wherein before searching for the detection content in the live broadcast content uploaded by the target camera device, the method further comprises:
   determining the live broadcast detection request is a valid request.

9. The method of claim 8, wherein determining that the live broadcast detection request is a valid request is based on at least one of:
   the target camera device is a contracted camera device; or
   a location of the terminal device is consistent with a location of the target camera device.

10. A server, comprising:
a memory storing instructions; and
a processor configured to execute the instructions to cause the server to:
  receive, from a terminal device, a live broadcast detection request for performing live broadcast detection on a target camera device;
  send a synchronization request message to the terminal device;
  receive a synchronization acknowledgment message returned by the terminal device;
  determine, according to the synchronization request message and the synchronization acknowledgment message, that a time delay between the server and the terminal device is within a synchronization error range;
  receive, from the target camera device, live broadcast content;
  search for detection content in the live broadcast content, wherein the detection content is outputted by the terminal device at a detection time and provided for being captured by the target camera device; and
  return, in response to determining that the detection content is found to be captured at the detection time in the live broadcast content, a live broadcast detection result to the terminal device.

11. A non-transitory computer-readable medium that stores a set of instructions that are executable by at least one processor of a computer to cause the computer to perform a live broadcast detection method, the method comprising:
  receiving a live broadcast detection request for performing live broadcast detection on a target camera device;
  sending a synchronization request message to a terminal device;
  receiving a synchronization acknowledgment message returned by the terminal device;
  determining, according to the synchronization request message and the synchronization acknowledgment message, that a time delay between the server and the terminal device is within a synchronization error range;
  searching for detection content in live broadcast content uploaded by the target camera device, wherein the detection content is outputted by the terminal device at a detection time and provided for being captured by the target camera device; and
  in response to the detection content being found to be captured at the detection time in the live broadcast content, returning a live broadcast detection result to the terminal device.

12. The non-transitory computer-readable medium of claim 11, wherein in searching for the detection content in the live broadcast content uploaded by the target camera device, the set of instructions that is executable by the at least one processor of the computer causes the computer to further perform:
  determining the detection time and the detection content; and
  searching for the detection content captured at the detection time in the live broadcast content.

13. The non-transitory computer-readable medium of claim 12, wherein in determining the detection time and the detection content, the set of instructions that is executable by the at least one processor of the computer causes the computer to further perform:
  receiving, from the terminal device, the detection content and information about the detection time.

14. The non-transitory computer-readable medium of claim 12, wherein in determining the detection time and the detection content, the set of instructions that is executable by the at least one processor of the computer causes the computer to further perform:
  determining information about the detection time with reference to a current time; and
  generating the detection content according to a key associated with the target camera device and the information about the detection time.

15. The non-transitory computer-readable medium of claim 14, wherein before searching for the detection content at the detection time in the live broadcast content, the set of instructions that is executable by the at least one processor of the computer causes the computer to further perform:
  sending the detection content and the information about the detection time to the terminal device.

16. The non-transitory computer-readable medium of claim 11, wherein before searching for the detection content in the live broadcast content uploaded by the target camera device, the set of instructions that is executable by the at least one processor of the computer causes the computer to further perform:
  sending a detection approval message to the terminal device.

17. The non-transitory computer-readable medium of claim 11, wherein the set of instructions that is executable by the at least one processor of the computer causes the computer to further perform:
  in response to the detection content being found in the live broadcast content, stopping broadcasting the live broadcast content uploaded by the target camera device.

18. The non-transitory computer-readable medium of claim 11, wherein before searching for the detection content in live broadcast content uploaded by the target camera device, the set of instructions that is executable by the at least one processor of the computer causes the computer to further perform:
  determining the live broadcast detection request is a valid request.

19. The non-transitory computer-readable medium of claim 18, wherein the determining that the live broadcast detection request is a valid request is based on at least one of:
  the target camera device is a contracted camera device; or
  a location of the terminal device is consistent with a location of the target camera device.

* * * * *